United States Patent [19]

Matsuki

[11] Patent Number: 5,193,126
[45] Date of Patent: Mar. 9, 1993

[54] IMAGE DEFORMATION METHOD AND APPARATUS USING COORDINATE TRANSFORMATION

[75] Inventor: Hiroshi Matsuki, Moriguchi, Japan

[73] Assignee: Toyo Ink Mfg. Co., Ltd., Tokyo, Japan

[21] Appl. No.: 644,306

[22] Filed: Jan. 18, 1991

[30] Foreign Application Priority Data

Jan. 25, 1990 [JP] Japan .................................. 2-15553
Jan. 25, 1990 [JP] Japan .................................. 2-15554
Mar. 2, 1990 [JP] Japan .................................. 2-51047
Mar. 2, 1990 [JP] Japan .................................. 2-51048
Mar. 2, 1990 [JP] Japan .................................. 2-51049

[51] Int. Cl.$^5$ ............................................. G06K 9/32
[52] U.S. Cl. ..................................... 382/44; 382/45; 382/46; 382/47
[58] Field of Search ................... 382/44, 41, 40, 45–47

[56] References Cited

U.S. PATENT DOCUMENTS 4,674,125  6/1987  Carlson et al. ........................ 382/49
4,718,091  1/1988  Kobayashi et al. .................... 382/49

Primary Examiner—Jose L. Couso
Attorney, Agent, or Firm—Martin A. Farber

[57] ABSTRACT

Image deformation apparatus has memory units for storing image data, and coordinate transformation units for transforming coordinates of image data stored in the memory units so that the image data in the memory units can be treated as a two-dimensional image with use of a two-dimensional coordinate transformation unit. This enables formation of two-dimensional images such as magnified images and reduced images and the like, processed by two-dimensional image deformation.

14 Claims, 27 Drawing Sheets

FIG. 5(1)
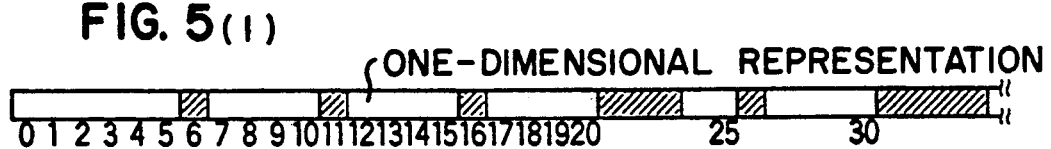

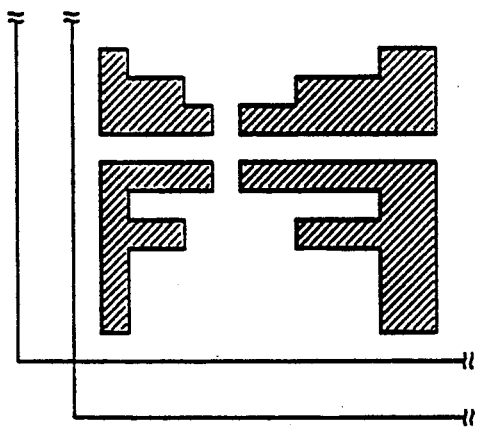
FIG. 5(8)

FIG. 6
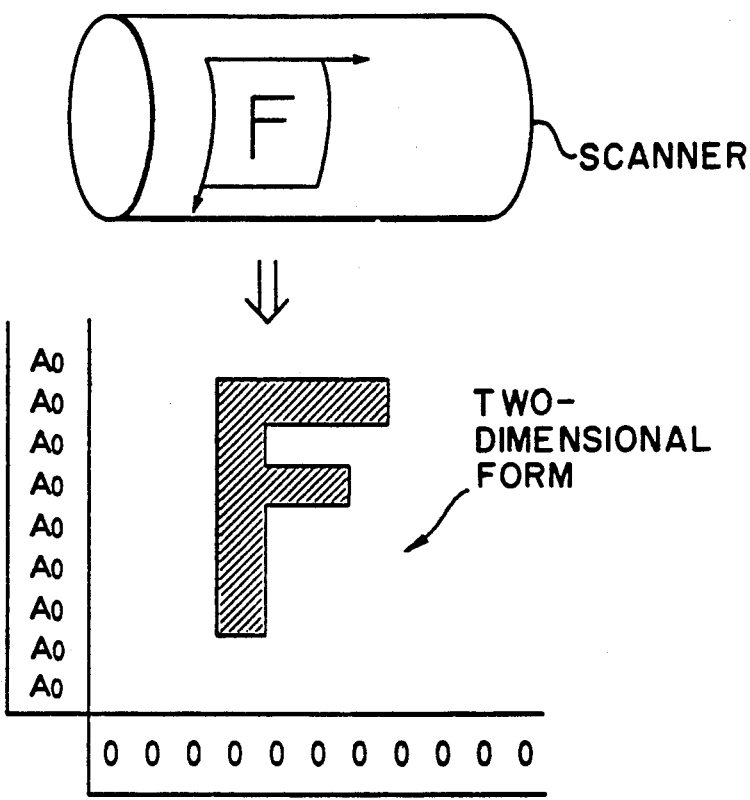
FIG. 7(1)
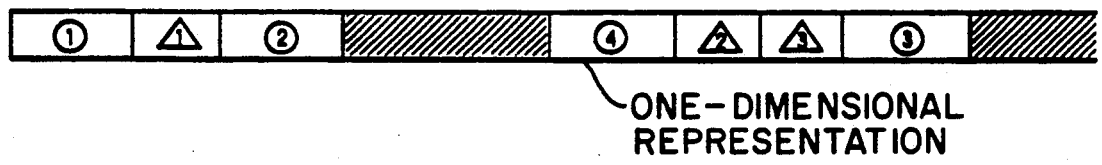
FIG. 7(2)     FIG. 7(3)
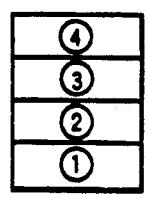  

FIG. 27

| Y1 | Y2 | ADDRESS | $\sqrt{Y_1^2+Y_2^2}$ |
|---|---|---|---|
| 255 | 255 | 255×256+255=25536··· | 360 |
| 255 | 254 | 255×256+254=65535··· | 359 |
| 255 | 253 | 255×256+253=65534··· | 359 |
| ⋮ | ⋮ | ⋮ | ⋮ |
| 2 | 0 | 2×256+ 0=512 ··· | 2 |
| 1 | 255 | 1×256+255=511 ··· | 255 |
| ⋮ | ⋮ | ⋮ | ⋮ |
| 1 | 2 | 1×256+ 2=258 ··· | 2 |
| 1 | 1 | 1×256+ 1=257 ··· | 1 |
| 1 | 0 | 1×256+ 0=256 ··· | 1 |
| 0 | 255 | 0×256+255=255 ··· | 255 |
| ⋮ | ⋮ | ⋮ | ⋮ |
| 0 | 2 | 0×256+ 2=2 ··· | 2 |
| 0 | 1 | 0×256+ 1=1 ··· | 1 |
| 0 | 0 | 0×256+ 0=0 ··· | 0 |

~96

IMAGE DEFORMATION METHOD AND APPARATUS USING COORDINATE TRANSFORMATION

BACKGROUND OF THE INVENTION AND EVALUATION OF BACKGROUND TECHNIQUE

The present invention relates to an image processing apparatus. It is known in the art that in image processing, magnified images, reduced images and rotated images or other processed images are displayed on a display device by processing a stored original digital image.

The present invention also relates to a coordinate transformation technique used in digital image processing, and more particularly to a technique of accessing a one-dimensional address on a one-dimensional coordinate system by using a two-dimensional address on a two-dimensional coordinate system.

The present invention also relates to a coordinate transformation technique used for digital image processing and the like, and more particularly to coordinate transformation between two two-dimensional coordinate systems.

The present invention also relates to a data calculation technique used for digital image processing and the like, and more particularly to a technique for performing binary operation between two pixel data at high speed.

The present invention also relates to a data width conversion technique used for digital data processing, and more particularly to a memory unit which can cope with a change in data width.

It is known in the art that in image processing, a digital image is displayed on a display device, or other processed images such as magnified images, reduced images and rotated images are also displayed by processing a stored original image.

It is necessary for such image processing to transform the coordinate value of an address.

Transformation between one-dimensional and two-dimensional coordinate systems is often used with an image processing apparatus. Conventionally hardware technique or software technique with CPUs have been used for coordinate transformation. With the hardware technique, a special image memory called a frame buffer has been used which has a fixed image size to be displayed and a predetermined image to be processed.

The above hardware transformation technique has an advantage that if an image size is fixed, the two-dimensional coordinate values of an image have a very simple correspondence with the one-dimensional coordinate values of memory addresses of actual data. However, if the image size or the pixel address is to be changed, the capacity of an image memory becomes bulky and the relation between the image coordinate values and actual one-dimensional addresses becomes complicated, leading to a difficulty of improving the image quality, image resolution, and memory use efficiency.

The above software transformation technique has a problem of an increase of programs for calculating addresses and a problem of a long processing time.

In view of the above, there has been proposed to use a coordinate transformation circuit for transforming addresses represented by two-dimensional coordinate values into one-dimensional actual addresses (refer to Japanese Patent Laid-open Publication No. 63-6645).

However, a particular transformation circuit is not proposed in the Publication, and this technique has not yet realized in practice.

A two-dimensional digital image is displayed by allocating a number of pixels to a display unit in a matrix format and giving image information such as density to each pixel.

In order to edit a digital image, such as magnification, reduction, rotation, movement, and modification, it is necessary to transfer the density of each pixel of an original image to another pixel. Namely, two-dimensional coordinate transformation is required for transforming one pixel coordinate value to another pixel coordinate value.

Such transformation has been executed heretofore by hardware technique or software technique.

Although the hardware scheme takes less processing time, it limits the type of transformation to simple scheme one such as affine transformation. This is also associated with a problem of a fixed image size and position. The software scheme can freely select the type of transformation, but it poses a problem of a long processing time required for image conversion.

Texture mapping or the like that is well known for obtaining two-dimensional image of a three-dimensional image can obtain a desired converted image, but it requires complicated equations for coordinate transformation so that a hardware scheme is not suitable, and also a software scheme requires complicated programs for sequentially processing all pixels for a long time. Furthermore, even if the same transformation is executed for a plurality of images, similar calculations must be repeated for each image, thereby not reducing the processing time.

Inter-pixel data calculation in digital image processing, as for interpolation of values of data between sampled points to allow for enlargement of an image, is often executed by software with CPUs or hardware with a limited type of calculations such as addition, subtraction, multiplication, division and the combination thereof.

The software scheme takes a lot of processing time, and the hardware scheme limits applications.

A digital image includes a tonal image having a pixel data of a tonal value representative of the density of color, and a specified (spot) color image having a pixel data of a color discrimination number called a color number.

A tonal image includes a monochromatic binary image, monochromatic multi-value image, and a full color image composed of primary color multi-value images (four or three colors). The data width of a pixel of these images generally used is 1 bit, 8 bits (1 byte), 32 bit (4 bytes) or 24 bits (3 bytes) respectively.

A specified color image is mainly used as a masking image and a tint image. The data width of a pixel of these images generally used is 1 bit or 8 bit.

As above, in digital image processing, the data width changes with the type of an image to be processed.

A digital processing apparatus such as a computer has a specific bus size, or the number of parallel accessible bits, and processes data in units of specific bits to obtain a better efficiency. For image processing, particularly for image processing including a prepress process, it is preferable to use, or there is often used in actual, an apparatus having a bus size capable of parallel processing 32 bits which correspond to the data width of a pixel of a full color image represented by four primary colors Y (yellow), M (magenta), C (cyan), and K (black) each having 8 bit 256 tonal values.

However, as described above, the image data uses various data widths (bit length). For example, if an image processing apparatus having a bus size of 32 bits processes a pixel data of 1 byte (8 bits) width, it reads/writes the data on the four pixel unit basis. In order to read/write the data one pixel after another, the data is required to be processed by software with CPUs, resulting in a long processing time.

Although 8 bit data may be stored in the 32 bit space of a memory of the image processing apparatus running on the 32 bit basis, three fourth of the memory capacity becomes unused.

SUMMARY OF THE INVENTION

The present invention has been made in consideration of the above circumstances. It is an object of the present invention to provide an image processing apparatus capable of providing better image processing without making the apparatus large.

It is another object of the present invention to develop a technique for transforming an address expressed by two-dimensional coordinate values into a one-dimensional actual address, and to provide an image transformation method and apparatus capable of reducing a processing time by using simple devices, and a one-dimensional frame buffer using the above techniques.

It is a further object of the present invention to provide a two-dimensional coordinate transformation method and apparatus wherein not only affine transformation used for ordinary image editing such as magnification, reduction, rotation, parallel displacement, and a combination thereof, but also other transformations of higher degree of freedom can be achieved in a short time, specifically an optional input coordinate values (x, y) can be transformed in a short time into the coordinate system (X, Y) satisfying the equations $$X = f(x) + g(y)$$

$$Y = h(x) + k(y)$$

where f(x) and h(x) are an optional function of x, g(y) and h(y) are an optional function of y, and the values x and y are an integer taking a value within a predetermined range, and thus, it is possible to obtain the two-dimensional coordinate transformation method and apparatus capable of shortening the coordinate transformation time without using a bulky apparatus.

It is a still further object of the present invention to provide a coordinate transformation method and apparatus and an image conversion method wherein coordinate transformation can executed at high speed which is necessary for converting, such as as moving and deforming, a digital image as desired, therefore, not only affine transformation but also other transformations of higher degree of freedom can be executed at high speed, and furthermore, if a same transformation is conducted for a plurality of images, it is not necessary to calculate the coordinate transformation each time a different image is used, but the results calculated once can be used for a plurality of images at very high speed as many times as desired.

It is another object of the present invention to provide an inter-pixel data calculation apparatus capable of high speed image processing by executing binary operations of a high degree of freedom at high speed while considering the characteristics of images.

It is a further object of the present invention to provide a memory unit wherein even if the data width of a pixel data or the like to be processed is not equal to the bus size, any unit number of data per one pixel corresponding to a bus size cna be read/written by changing the number of memory sub-groups constituting the memory group, accordingly, it is possible to obtain a memory unit by which a data of one pixel unit can be read at a fixed time with simplified data processing and without wastefully using the memory.

To achieve the above objects, a first embodiment of the invention provides an image processing apparatus comprising:

a two- to one-dimensional address coordinate transformation unit for the transformation between a one-dimensional address coordinate value and a two-dimensional address coordinate value;

a two-dimensional coordinate transformation unit for transforming coordinate values (x, y) within a predetermined area on an x-y coordinate system into coordinate values (X, Y) within a predetermined area on an X-Y coordinate system;

an inter-pixel data calculation unit for calculating two pixel data; and a memory unit.

A second embodiment of the invention provides a coordinate transformation method wherein a sum $1 = f(x) + g(y)$ of functions $f(x)$ and $g(y)$ of two elements (x, y) is used as an address coordinate value on a one-dimensional coordinate system, said two elements being the two-dimensional coordinate values determining an address of a two-dimensional coordinate system.

A third embodiment of the invention provides an image coordinate transformation method comprising the steps of:

previously setting the value of f(x) to XT as an element $XT_x$;

previously setting the value of g(y) to YT as an element $YT_x$;

deriving $XT_x$ and $YT_y$ respectively corresponding to x and y;

adding $XT_x$ and $YT_y$ to output $1 = f(x) + g(y)$ to thereby determine a correspondence between $a_{x,y}$ and $B_1$, wherein $a_{x,y}$ is a data of a coordinate value (x, y) on a two-dimensional coordinate system, $b_1$ is a data of a coordinate value 1 on a one-dimensional coordinate system for a one-dimensional medium, f(x) is a function of x, XT is and x-direction address offset table for storing the value of f(x), g(y) is a function of y, and YT is a y-direction address offset table for storing the value of g(y).

A fourth embodiment of the invention provides an image coordinate transformation apparatus comprising:

a two-dimensional address supplier for supplying a two-dimensional address x, y;

an x-direction address offset table XT for previously storing $XT_x$ for each value x;

a y-direction address offset table YT for previously storing $YT_x$ for each value y;

a x-direction address offset reader XTR for reading $XT_x$ for a given x value;

a y-direction address offset reader YTR for reading $YT_y$ for a given y value;

an adder for adding together $XT_x$ and $YT_y$ supplied from XTR and YTR; and a calculation unit for previously setting the values of f(x) and g(y) for values x and y in said x- and y-direction address offset tables.

A fifth embodiment of the invention provides a one-dimensional frame buffer for an image display device, comprising:

a two-dimensional address supplier for supplying a two-dimensional address x, y, wherein the actual data of an element $a_{x,y}$ of a two-dimensional data matrix a [X, Y] of an image is stored in a one-dimensional data matrix b in memory unit, said two matrices being related to each other by $b_\alpha+(y-1)X+(x-1)=a_{x,y}$ where $\alpha$ is an optional constant;

an x-direction address offset table XT for previously storing XTx for each value x;

a y-direction address offset table YT for previously storing YTx for each value y;

an x-direction address offset reader XTR for reading XTx for a given x value;

a y-direction address offset reader YTR for reading YTy for a given y value;

an adder for adding together XTx and YTy supplied from XTR and YTR; and a calculation unit for previouly setting the values of $f(x)=x-1$ and $g(y)=(y-1)X+\alpha$ for values x and y in said x- and y-direction address offset tables.

In the image coordinate transformation method and apparatus and the one-dimensional frame buffer of the first to fifth inventions, upon supplying a two-dimensional, address x and y, the values of the functions f(x) and g(y) stored in the address offset tables are read. Then, the values of the functions f(x) and g(y) are added together to output the address $1=f(x)+g(y)$ of a one-dimensional coordinate system to thereby complete two-to one-dimensional address transformation.

A sixth embodiment of the invention provides a two-dimensional coordinate transformation method of performing coordinate transformation using transformation equations $X=f(x)+g(y)$ and $Y=h(x)+k(y)$ for the transformation of coordinate values (x, y) on an X-Y coordinate system within a predetermined area into coordinate values (X, Y) on an X-Y coordinate system within a predetermined area, where f(x) and h(x) are a function of x and g(y) and k(y) are a function of y, wherein there are provided an X-x correspondence value table Xx for storing the value of f(x) for each value x, an X-y correspondence table Xy for storing the value of g(y) for each value y, a Y-x correspondence value table Yx for storing the value of h(x) for each value x, and Y-y correspondence value table Yy for storing the value of k(y) for each value y, said method comprising the steps of:

previously storing the values of f(x) and h(x) for each value x in cells $XX_x$ and $Yx_x$ of Xx and Yx;

previously storing the values of g(y) and k(y) for each value y in cells $Xy_y$ and $Xy_y$ of Xy and Yy;

reading the values of f(x) and h(x) for each value x from $Xx_x$ and $Yx_x$;

reading the values of g(y) and k(y) for each value y from $Xy_y$ and $Yy_y$;

outputting a sum of the read values of f(x) and g(y) as a value X, and outputting a sum of the read values of h(x) and k(y) as a value Y.

A seventh embodiment of the invention provides a two-dimensional coordinate transformation apparatus for performing coordinate transformation using transformation equations $X=f(x)+g(y)$ and $Y=h(x)+k(y)$ for the transformation of coordinate values (x, y) on an x-y coordinate system within a predetermined area into coordinate values (X, Y) on an X-Y coordinate system within a predetermined area, where F(x) and h(x) are a function of x and g(y) and k(y) are a function of y, said apparatus comprising:

a two-dimensional coordinate value supplier for supplying said coordinate value (x, y);

an X-x correspondence value table Xx for storing the value of f(x) for each value x;

an X-y correspondence value table Xy for storing the value of g(y) for each value y;

a Y-x correspondence value table Yx for storing the value of h(x) for each value x;

a Y-y correspondence value table Yy for storing the value of k(y) for each value y;

an X-x correspondence value reader for reading the value of a cell $Xx_x$ of the X-x correspondence value table for a given value x;

a Y-x correspondence value reader for reading the value of a cell $Yx_x$ of the Y-x correspondence value table for a given x;

an X-y correspondence value reader for reading the value of a cell $Xy_y$ of the X-y correspondence value table for a given y;

a Y-y correspondence value reader for reading the value of a cell $Xx_y$ of the Y-y correspondence value table for a given y;

an X coordinate value calculator for outputting a sum of the read values of cells $Xx_x$ and $Xy_x$ as a value X, and a Y coordinate value calculator for outputting a sum of the read values of cells $Yx_x$ and $Yy_y$ as a value Y.

According to the two-dimensional coordinate transformation apparatus constructed as above of the sixth and seventh inventions, the values f(0), f(1), ..., f(n) for integer values within a predetermined area, for example, 0, 1, 2, ..., n are stored in cells $Xx_0, Xx_1, ..., Xx_n$ of the X-x correspondence value table, the values h(0), h(1), ..., h(n) are stored in cells $Yx_0, Yx_1, ..., Yx_n$ of the Y-x correspondence value table, the values g(0), g(1), ..., g(m) for integer values within a predetermined area, for example, 0, 1, 2, ..., m are stored in cells $Xy_0, Xy_1, ..., Xy_n$ of the X-y correspondence value table, and the values k(0), k(1), ..., k(n) are stored in cells $Yy_0, Yy_1, ..., Yy_n$ of the Y-y correspondence value table. Upon sequentially supplying values (x, y), the value f(x) in the cell $Xx_x$ is read by the X-x correspondence value reader, and the value g(y) in the cell $Xy_y$ is read by the X-y correspondence value reader. The values f(x) and g(y) are added together by the X coordinate value calculator and outputted as X. Similarly, the values of h(x) in the cell $Yx_x$ and k(y) in the cell $Yy_y$ are read and added together to be outputted as Y. Values (X, Y) satisfying the relation $X=f(x)+g(y)$ and $Y=h(x)+k(y)$ are sequentially outputted to thus complete the coordinate transformation.

With the two-dimensional coordinate transformation apparatus, the time required for the transformation of one coordinate value is very short because the time corresponds to the time required for executing an addition operation once.

If the coordinate value (X, Y) is for a pixel of an image for example, and the transformation result is obtained as a pair of integers, this pair can be used as it is. However, if the pair includes at least one value having a fraction part, this fraction part is round down to obtain an integer. Namely, instead of (X, Y), (X', Y')=([X], [Y]) is used.

An eighth embodiment of the invention provides a two-dimensional coordinate transformation method for the coordinate transformation of coordinate values (x, Y) on an x-y coordinate system into coordinate values (X, Y) on an X-Y coordinate system, comprising the steps of:

setting the data of a function $f_{x,y}(X, Y)$ to a memory unit at the address represented by the coordinate values (x, y), said function being selected such that the values X and Y can be separately derived for given x and y; and separately deriving the values X and Y from the data of the function $f_{x,y}(X, Y)$ for the given address (x, y) and outputting the values X and Y as coordinate values (X, Y).

A ninth embodiment of the invention provides a coordinate transformation apparatus comprising:

a memory unit for storing the data of a function $f_{x,y}(X, Y)$ and separately deriving values X and Y upon supplying a coordinate value address (x, y);

a processor for obtaining the data of the function $f_{x,y}(X, Y)$ for all necessary x and y and setting the data in the memory unit;

a reader for reading the data of the function $f_{x,y}(X, Y)$ for a given coordinate address (x, y); and an XY coordinate value pickup unit for separately picking up and outputting the values X and Y from the read data of the function $f_{x,y}(X, Y)$.

A tenth embodiment of the invention provides an image conversion method comprising the steps of;

Setting the data of a function $f_{x,y}(X, Y)$ in a memory unit at a coordinate value address (x, y), said function being selected such that the values X and Y can be separately derived for given x and y;

transforming the coordinate values (x, y) into coordinate values (X, Y) in accordance with a coordinate transformation method by which the values of X and Y are separately derived from the data of the function $f_{x,y}(X, Y)$ for a given address (x, y) and the values X and Y are outputted as the coordinate values (X, Y); and reading data from an image memory storing an original image at the address (x, y), and writing the read data in a converted image writing memory at the address (X, Y), or reading the data from the image memory at the address (X, Y), and writing the read data in the converted image writing memory at the address (x, y).

According to the coordinate transformation method and apparatus constructed as above of the eighth and ninth inventions, the data of f(X, Y) for all necessary x and y is calculated by the calculator and stored in the memory at an address (x, y). When a coordinate value (x, y) is supplied from the coordinate value supplier, the data of f(X, Y) stored in the memory at the address (x, y) is read by the reader. X and Y are separately derived by the XY coordinate value pickup device from the read data of f(X, Y) to output as a coordinate value (X, Y).

According to the image conversion method arranged as above of the tenth invention, there are provided the coordinate transformation apparatus and two image memories. In accordance with the supplied coordinate value (x, y), the image conversion is effected in the following manner. The image data is read from the image memory storing an original image at the address (x, y). The read image data is written in the other image memory at an address (X, Y). Alternatively, the image data is read from the image memory storing the original image at the supplied coordinate value address (X, Y), and the read image data is written in the other image memory at the address (x, y).

An eleventh embodiment of the invention provides n inter-pixel data calculation apparatus comprising:

a first pixel data supplier for supplying a pixel data A composed of a plurality type of element data;

a second pixel data supplier for supplying a pixel data B composed of a plurality type of element data;

a plurality of first element data selectors connected to the output side of said first pixel data supplier for selecting one of said plurality of element data from said supplied pixel data A;

a plurality of second element data selectors connected to the output side of said second pixel data supplier for selecting one of said plurality of element data from said supplied pixel data B;

a plurality of binomial operation devices each connected to the output side of one of said first element data selectors for selecting an element data of said pixel data A and to the output side of one of said second element data selectors for selecting an element data of said pixel data B, for outputting the result of the binomial operation between the selected two element data; and a calculator for setting the type of an element data to be selected by said element data selector and setting the type of the binomial operation to be performed by said binomial operation device.

According to the inter-pixel data calculation apparatus constructed as above of the eleventh invention, prior to inter-pixel data calculation, the calculator sets the type of element data to be selected by the element data selector and thereafter processed and the type of binomial operation to be carried out by the binomial operation unit, respectively in accordance with the type of inter-pixel data calculation to be performed.

Next, when the pixel data A is supplied from the pixel data supplier to the plurality of element data selectors, each element data selector selects one element data previously set.

Similarly, when the pixel data B is supplied from the pixel data supplier to the plurality of element data selectors, each element data selector selects one element data to be processed and previously set.

The element data selected from the pixel data A and B is inputted to the binomial operation unit and undergoes the binomial operation to output the result.

If desired, different binomial operations may be executed in parallel at different binomial operation units to thereby reduce the processing time. If each binomial operation unit is constructed of a calculation result table and a reader, the calculation results of all necessary binomial operations are previously stored in the calculation result tables. In accordance with a combination of two element data values selected by the element data selectors from the pixels A and B, the binomial operation results for the two element data values are read from the calculation result tables and outputted, to thereby allow high speed processing.

A twelfth embodiment of the invention provides a memory unit comprising;

a memory comprising n memory sub-groups each having a capacity of k bits×m words, said sub-groups being assigned m word numbers 0. 1, 2, ..., m−1 and said word being constructed of k bits accessible in parallel;

a memory group selecting unit for grouping said n memory sub-groups into n/s memory groups each having s (s≦n) memory sub-groups capable of parallel reading/writing, said memory groups being assigned memory group numbers 0, 1, 2, . . . , (n/s)−1; and a memory read/write unit for parallel reading/writing the memory portion of k×s bits designated by an address whihc is obtained from a combination of said memory group number and said word number.

According to the memory unit constructed as above of the twelfth invention, for example, one memory sub-group is constructed of eight parallel connected memory chips each having 1 bit×1M words. If 32 memory sub-groups are used (k=8, m=1 M, n=32), the number s of memory sub-groups of the memory group is changed with the data width of a pixel data to be processed, e.g., the number s being set to 4 (accordingly the number of memory groups is 8) for the 32 bit data width and the number s being set to 1 (accordingly the number of memory groups is 32) for the 8 bit data width, to thereby read/write data one word after another from one memory group.

In the former case, a data having the data width of 32 bits is processed as a 32 bit data so that an apparatus having a 32 bit bus size can be used without modifying it. Also in the latter case, a data having the data width of 8 bits or 1 bit can be processed as a 32 bit data. In this case however, the remaining bits other than 8 bits or 1 bit are read/written as invalied data. In both cases, a unit data can be read/written during a predetermined time period and processed efficiently.

BRIEF DESCRIPTION OF THE DRAWINGS

FIG. 6 illustrates a virtual two-dimensional image obtained by applying the coordinate transformation apparatus to an input unit of a scanner;

FIGS. 7(1) to 7(3) illustrate the contents of a one-dimentsional memory storing a plurality of image information;

FIGS. 22(a) to 22(g) show examples of images converted in accordance with the image conversion method, wherein FIG. 22(a) shows an original image, and FIGS. 22(b) to 22(g) show converted images therefrom;

FIG. 27 illustrates how values are set in the calculation result table;

DESCRIPTION OF THE PREFERRED EMBODIMENTS

The embodiments of this invention will be described with reference to the accompanying drawings.

Figure 1:
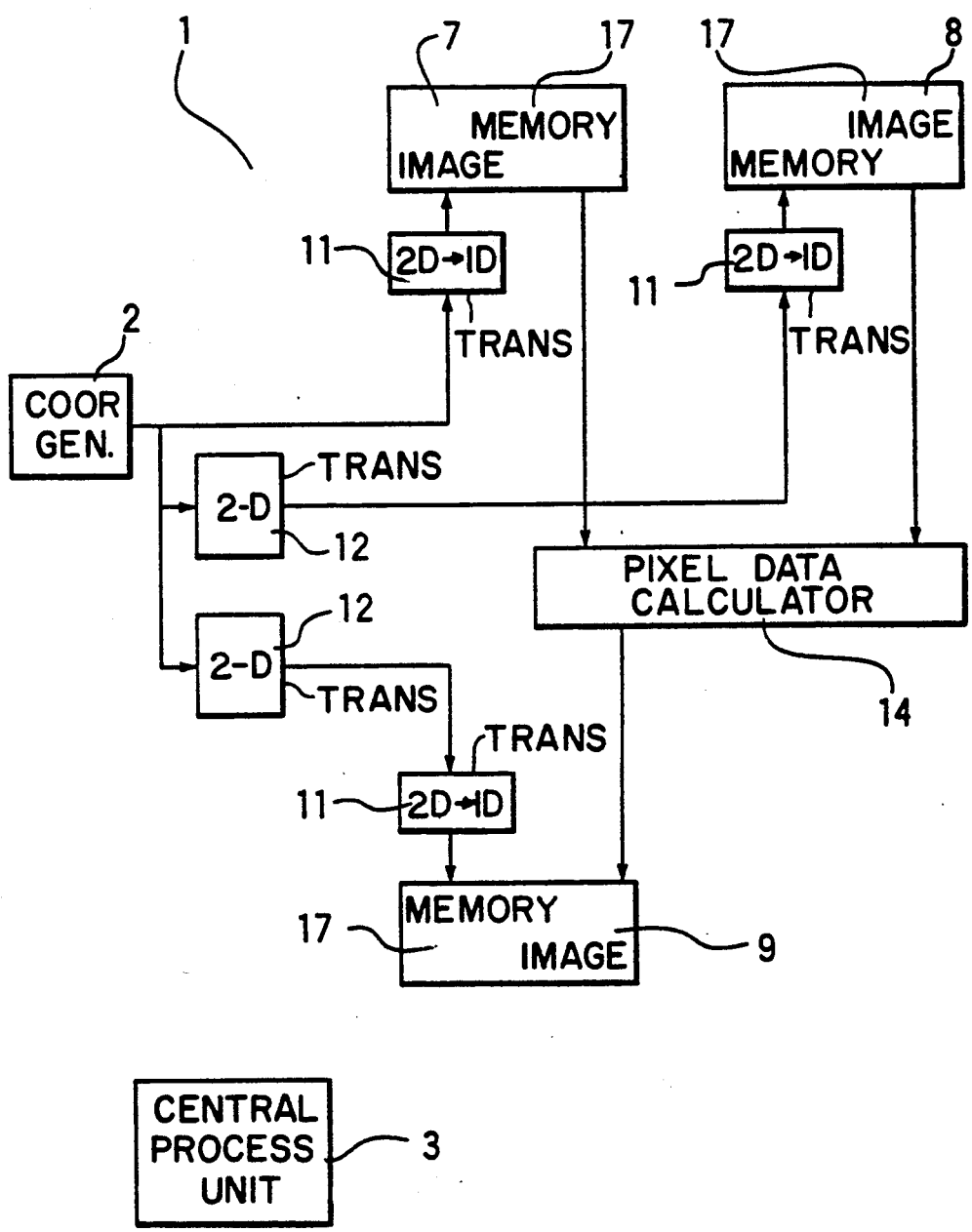
FIG. 1 shows the outline of the image processing system of this invention.

Referring to FIG. 1, an image processing apparatus generally designated by reference numeral 1 is constructed of an image coordinate value generator 2, a two-dimensional coordinate transformer 12 for transforming between coordinate values (x, y) within a predetermined area of x-y coordinate system and coordinate values (X, Y) within a predetermined area of X-Y coordinate system, a two- to one-dimensional coordinate transformer 11 for transforming two-dimensional coordinate values into one-dimensional coordinate values on a memory space, a memory unit 17 for storing an image, a inter-pixel data calculator 14 (a data smoother) for calculating an average data value of corresponding pixels in two successive images of a subject and a CPU 3 for initializing the calculator and performing other control operations.

Images 7, 8 and 9 are formed on the memory unit 17. The images 7 and 8 are combined or synthesized to write another image 9 on the memory unit 17 by calculating pixel data of the two images 7 and 8 by the pixel data calculator 14. Thereby, the pixel data calculation 14 can perform a data smoothing function by taking average values of corresponding pixels in two successive frames of data, stored as separate images 7 and 8 in the memory 14, to provide a smoothed image to be stored as image 9 in the memory 14.

Two-dimensional coordinate values of an object pixel of each image are generated by the image coordinate value generator 2 and transformed (as by rotation of an image) into other two-dimensional coordinate values by two two-dimensional coordinate value transformers 12 and 12. The transformed two-dimensional coordinate values are supplied to the two- to one-dimensional coordinate value transformer 11 and transformed into a memory address for the read/write of the pixel on the memory unit.

Three memory devices 17 as shown in FIG. 1, and may be combined into a single memory unit, and two two-dimensional coordinate value transformers 12 may have the same structure or may be constructed different from each other.

The number of two-dimensional coordinate value transformers 12, two- to one-dimensional coordinate value transformers 11, memory unit 17, and inter-pixel data calculators 14 may be increased to an image processing apparatus as an image synthesizing apparatus, or may be decreased to an image processing apparatus as an image modifying apparatus.

The coordinate transformation method and apparatus of the second to fourth inventions will be described.

Referring to FIG. 1, reference numeral 11 represents a coordinate transformer which is constructed of a two-dimensional address supplier 22, an x-axis address offset reader 23, a y-direction address offset reader 24, an address offset table 25, an adder 26, a memory read/write device 27, and a one-dimensional memory medium 28.

The address offset table 25 is constructed of an x-direction address offset table 31 and an a y-direction address offset table 32.

Prior to the activation of the coordinate transformer 11, all coordinate values (x, y) are set by another device such as a microcomputer 33 in the y- and x-direction address offset tables 31 and 32 in the form of: $XT0=f(0)$, $XT1=f(1)$, $XT2=f(2)$, ..., $XTn=f(n)$, and $YT0=g(0)$, $YT1=g(1)$, $YT2=g(2)$, ..., $YTm=g(m)$, where $x=0$ to n and $y=0$ to m. The x- and y-direction address offset tables 31 and 32 are constructed of a RAM, ROM or the like.

Addresses x and y or two-dimensional coordinate values x and y are supplied from the two-dimensional address supplier 22. Values XTx and YTy are read by the x-direction and y-direction address offset readers 23 and 24, and supplied to the adder via x- and y-direction data offset paths 44 and 45 to obtain a transformed one-dimensional address 1 which is then supplied via a one-dimensional coordinate value path 46 to the memory read/write device serving as an input/output port of the real memory, to thereby input/output actual data. In the above manner, the coordinate transformation between two- to one-dimensional coordinate values can be achieved which satisfies the transformation equation $f(x)+g(y)=1$.

Figure 2:
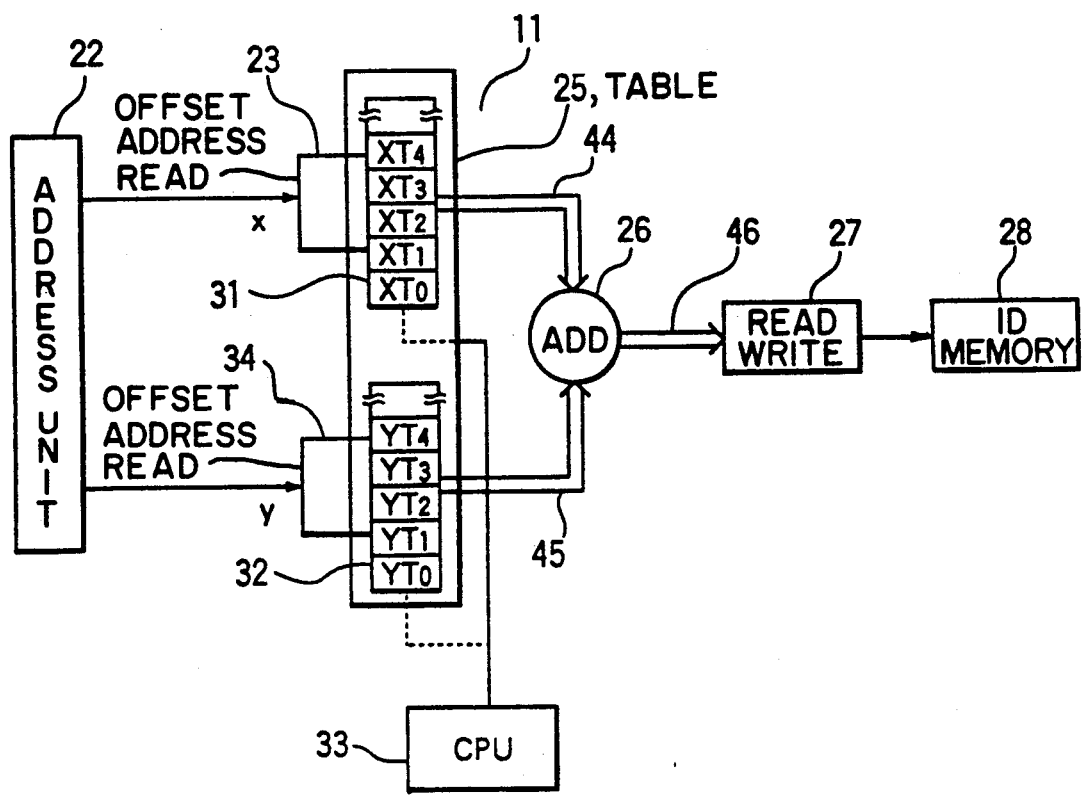
FIG. 2 illustrates the structure of a coordinate transformation apparatus.
Figure 3:
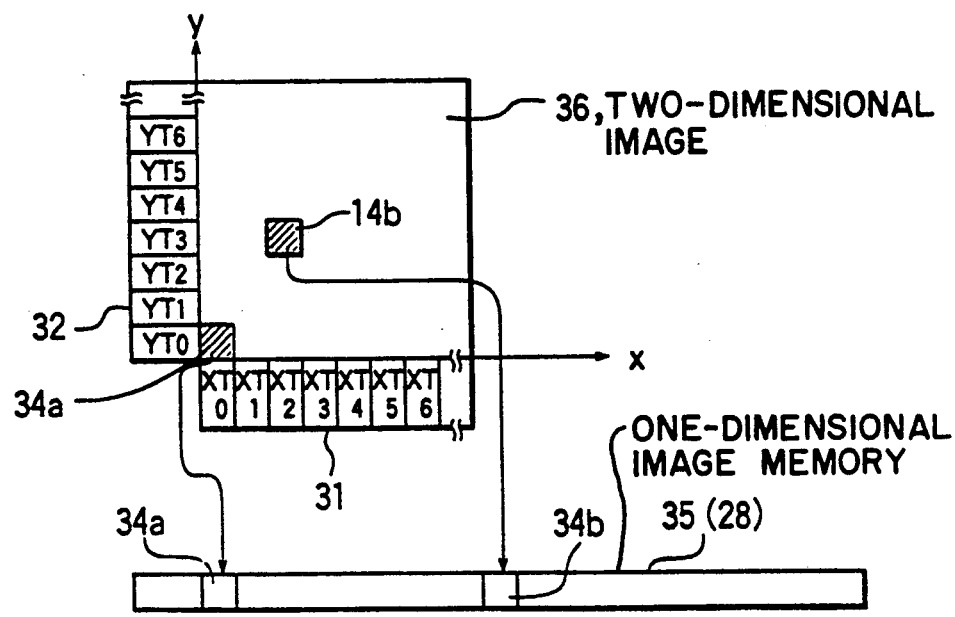
FIG. 3 illustrates a relationship between position of a pixels on a virtual two-dimensional image and on a one-dimensional memory.

FIG. 3 conceptually illustrates the relationship between one- and two-dimensional images according to the invention as described with FIG. 2. Assuming that the two-dimensional coordinate values x and y shown in FIG. 2 take an optional integer value, the one-dimensional image 35 on the one-dimensional memory medium 28 that include pixel 34 of FIG. 3 can be considered as transformed into a virtual (or transformed) two-dimensional image 36. Thus, with this apparatus of the invention, a two-dimensional image on the x-y plane can be dealt without considering the presence or structure of the one-dimensional actual memory.

Figure 4:
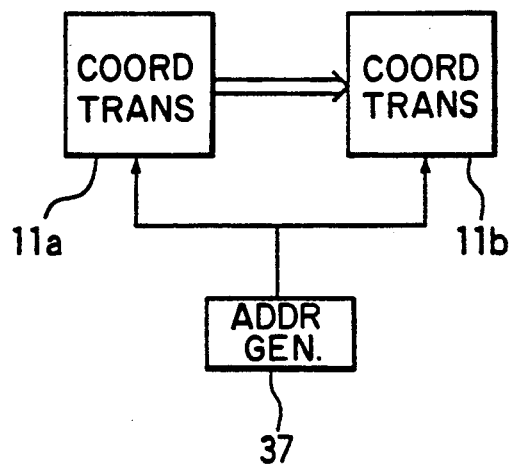
FIG. 4 illustrates the structure of an image conversion apparatus.

FIG. 4 shows an example of an apparatus wherein two coordinate transformers 11 of this invention are used to modify a two-dimensional image and obtain a new synthesized two-dimensional image. Reference numeral 37 represents an image address generator which generates all coordinate values of an image by repeating the operations of changing x from 0 to the maximum value with increment of 1, and then incrementing y is 1 and changing x from 0 to the maximum value and so on. With the above operations, an image defined by a coordinate transformer 11a (for reading an image) is read and written on an image defined by a coordinate transformer 11b (for writing an image). Depending upon the contents of the address offset table 25 of the coordinate transformers 11a and 11b with values for f(x) and g(y) being set, an image can be modified in various ways to obtain a new image. In the two coordinate transformers 11a and 11b shown in FIG. 4, a portion of one transformers may be used by the other, if possible.

Figure 5:
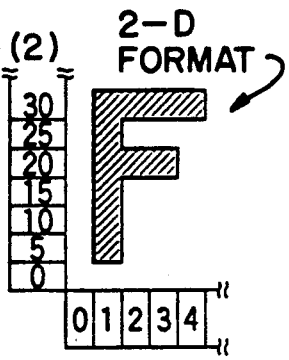
FIGS. 5(1) to 5(8) show examples of various images converted by using various coordinate transformation equations.
Figure 5:
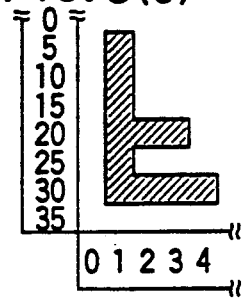
Figure 5:
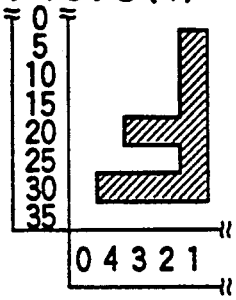
Figure 5:
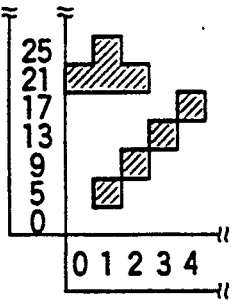
Figure 5:
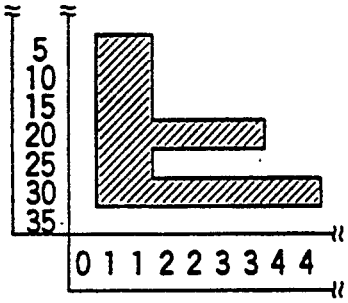
Figure 5:
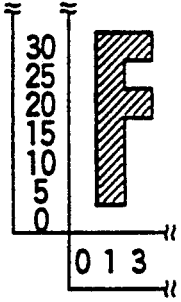
Figure 8:
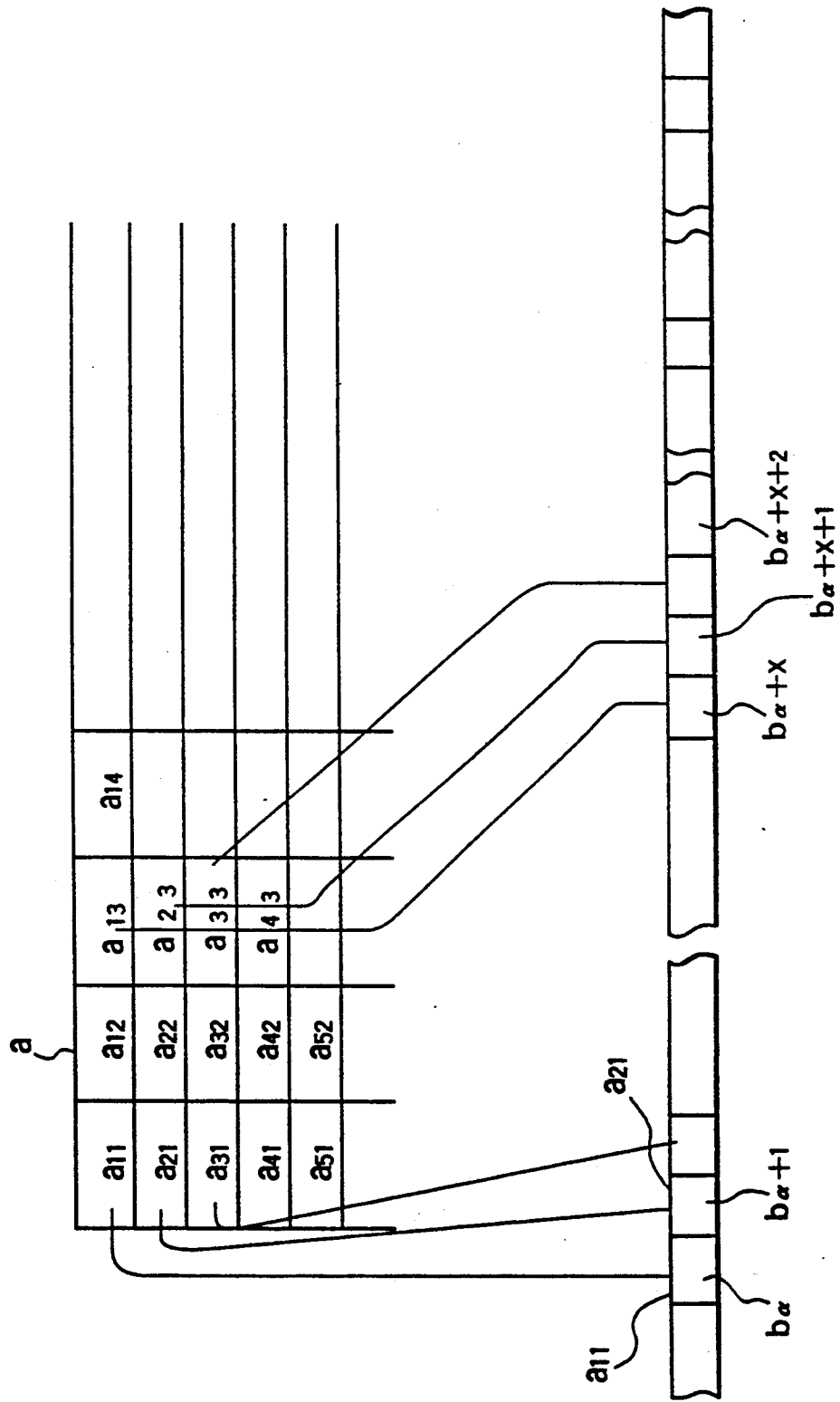
FIG. 8 is a view explaining the relationship between the addresses of the image information on a screen and on a one-dimensional memory.

FIGS. 5(1) to 5(8) show examples of address offset data for (x) and g(y). The one-dimensional coordinate data (1) can be modified to two-dimensional coordinate data FIGS. 5(2) to 5(8) depending on the set values of f(x) and g(y).

If transformation into a one-dimensional image on a memory of this invention is applied to an image input/output device such as an image scanner, a pixel serially inputted from the image input/output device can be dealt as a two-dimensional image.

FIG. 5 shows examples of address offset data for terms f(x), g(y) of the transformation equation $f(x)+g(y)=1$ which set address offsets XTx, YTy and the transformed two dimensional images. FIG. 5(1) shows a one dimensional memory in which binary values of pixels of a two dimensional image are stored corresponding to their addresses. The stored binary values of each pixel are set as follows in order of address, in the one-dimensional memory of FIG. 5(1), namely 0,0,0,0,0,0,1,0,0,0,0,1,0,0,0,0,1,0,0,0,0,1,1,1,0,0,1,0,0,0, 0,1,1,1,1,0,0,0,0,0. In this sequence, 1,0,0,0,0 is a row of data points describing the bottom of the letter "F" in FIG. 5(2), and the subsequence 1,1,1,1,0 is a row of data points describing the top of the letter "F".

The "address offset" is the corresponding address of a pixel with reference to the two-dimensional presentation of FIG. 5(2). Upon comparison of FIG. 5(1) with FIG. 5(2), it is observed that the first subsequence at the left end of FIG. 5(1) represents the bottom row of FIG. 5(2), the last subsequence at the right end of FIG. 5(1) represents the top row of FIG. 5(2), and the middle subsequences represent middle rows. The theory of the invention teaches the use of the one-dimensional representation to accomplish manipulations expeditiously of a two-dimensional image.

FIG. 5(2) to FIG. 5(8) show relations between terms f(x), g(y) data sets of address offsets XTx, YTy for reading out two dimensional images from a one dimensional memory, shown FIG. 5(1), and read out and transformed images in which a binary value of each element is read by means of X direction address offset XTx and Y direction address offset YTy. These images are represented on display if necessary. To represent the transformed images on the display, address 1 of the one dimensional memory is represented by f(x)+g(y)=1 and positions (x,y) of the pixels on the display are sent to the display unit.

The case of FIG. 5(2), as an example, is described now in further detail. In this case, if the coordinate values are x=0, 1, 2, 3 and 4, and y=0, 1, 2, 3, 4, 5 and 6, then terms f(x) and terms g(y) are f(0)=0, f(1)=1, f(2)=2, f(3)=3, f(4)=4, and g(0)=0, g(1)=5, g(2)=10, g(3)=15, g(4)=20, g(5)=25, g(6)=30. Then values of f(x)s and g(y)s are stored as elements XTx and YTy of x direction address offset table 31 and y direction address offset table 32 shown in FIG. 2 respectively in the manner XTx=f(x) and YTy=g(y). Therefore now the x direction address offset and the y direction address offset are set XT0=0, XT1=1, XT2=2, XT3=3, XT4=4, YT0=0, YT1=5, YT2=10, XT3=15, YT4=20, YT5=25, YT6=30. After that, the image is presented on the display by supplying all of the coordinate values x,y (wherein x=0 to 4 and y=0 to 6) to display unit in order. In the case wherein each pixel D(x,y) of display, designated by coordinate value (x,y), has binary value 0 or 1 (bright or shadow) read from address of 1=f(x)+g(y) (that is XTx+XTy) of the one dimensional memory (1), then:

as to D(0,0), XT0+YT0=0, the binary value is 0
as to D(2,0), XT2+YT0=2, the binary value is 0
as to D(3,0), XT3+YT0=3, the binary value is 0
as to D(4,0), XT4+YT0=4, the binary value is 0
then
as to D(0,1), XT0+YT1=5, the binary value is 0
as to D(1,1), XT1+YT1=6, the binary value is 1
as to D(2,1), XT2+YT1=7, the binary value is 0
as to D(3,1), XT3+YT1=8, the binary value is 0
as to D(4,1), XT4+YT1=9, the binary value is 0

The procedure is performed continuously in the same manner up to the coordinate value x=4, y=6. As a result, the image shown in FIG. 5(2) is obtained on the display.

As other examples, the image shown in FIG. 5(3) is obtained in the manner that g(y) is set in reversed order of y to the case of FIG. 5(2); and f(x) is set in same order of x to the case FIG. 5(2). The image of FIG. 5(3) is axisymmetric to the image of FIG. 5(2). The image shown in FIG. 5(4) is obtained in the manner that both of f(x) and g(y) are set in reversed order of x and y to the case FIG. 5(2). The image of FIG. 5(4) is axisymmetric about xy axis to the image of FIG. 5(2). Further each image shown from FIG. 5(2) to FIG. 5(8) teach that any deformation or movement in x direction and y direction, and enlargement and reduction of images can be achieved by changing the setting of f(x) and g(y).

FIG. 6 shows an example of a scanner embodying this invention. In this example, the input port of the scanner is allocated to a virtual memory space (called a memory mapped I/O scheme), the address thereof being assumed as $A_0$.

If a combination of a plurality of coordinate transformers and image processing units is used, calculation between a plurality of two-dimensional images can be carried out at high speed.

Further, according to the present invention, a one-dimensional memory can be used efficiently when a plurality of different images are present on a one-dimensional memory. For example as shown in FIGS. 7(1) to 7(3), two-dimensional images having consecutive pixels as indicated at FIG. 7(2) and FIG. 7(3) can be stored efficiently in the one-dimensional image at optional addresses thereof by suitably arranging them through the two- to one-dimensional address transformation using the present apparatus.

The coordinate transformation apparatus of this invention can be used as an image display frame buffer. The frame buffer according to the fifth invention will be described. A frame buffer is generally an image memory for a one frame of display device. Such a frame buffer can be realized by a one-dimensional address memory and the image transformation apparatus of this invention. Specifically, in a two-dimensional data matrix a [X, Y] constituting one frame of an image. It is assumed that:

(1) actual data of an element $a_{x,y}$ is present on a one-dimensional medium b [I],
(2) elements of a are arranged from an optional element b $b_\alpha$ as
(3) $B_\alpha = a_{1,1}, b_{\alpha+1} = a_{2,1}, b_{\alpha2} = 3,1, \ldots, b_{\alpha+x-1} = a_{x,1}$ for all elements in the first column,
(4) and $b_{\alpha x} = a_{1,2}, b_{\alpha+x+1} = a_{2,2}, \ldots, b_{\alpha+2x-1} = a_{x,2}$ for all elements in the second column,
(5) with the relationship $b_{\alpha+(y-1)X+(x-1)} = a_{x,y}$ being
(6) generally established up to row Y.

In this case, the coordinate transformation apparatus of this invention is arranged in the following manner:
(a) so as to make the element at the column y and at the first row in the matrix a correspond with
(b) the element $b_{\alpha+(y-1)X}$ of the matrix b,
(c) there is set as $g(y) = (y-1)*X + \alpha$,
(d) so as to make $b_{\alpha+(y-1)X+(x-1)}$ corresponding to the y column and the x row of the matrix a to indicate,
(e) relative to $b_{\alpha+(y-1)X}$ corresponding to the y column and the first row of the matrix a,
(f) a relative element number,
(g) there is set as $f(x) = x - 1$,
(h) the two equations are set in the address offset table of the apparatus shown in FIG. 2,
(i) to thereby set XT and YT therein, and
(j) upon supplying x and y from the two-dimensional address supplier 22 to the address offset readers 23 and 24,
(k) to the position where the actual data for the element $a_{x,y}$ of the two-dimensional data matrix,
(l) there is outputted the value 1 for the element $b_1$ of the one-dimensional medium b.

By using the values x and y as the coordinate values of the frame buffer (or image) and the value 1 as the memory address of the frame buffer, the coordinate transformation apparatus of this invention can be used as a frame buffer for a general purpose image display device.

In the above-described embodiments, an address offset table with f(x) and g(y) being set has been used for deriving the one-dimensional coordinate values. Instead of using the address offset table, the values f(x) and g(y) may be derived using a calculation device.

According to the invention, since two-dimensional image information is stored in a one-dimensional storage medium, the size and position of an image to be processed can be set as desired. Furthermore, since address transformation between one-and two-dimensional addresses is realized by the hardware address offset table, two- to one-dimensional coordinate transformation can be performed at high speed, thereby allowing high speed large capacity image processing. Furthermore, by selecting suitable coordinate transformation equations, image modification (rotation in unit of 90 degrees, mirroring, magnification, reduction and the like) can be easily achieved. Still further, the actual image position on the memory can be set as desired in accordance with the column or row defining image information on a two-dimensional coordinate system. Thus, the one-dimensional memory can be used efficiently for the case where there are a plurality of images to be stored.

Next, there will be described the two-dimensional coordinate transformation method and apparatus according to the sixth and seventh inventions.

Figure 9:
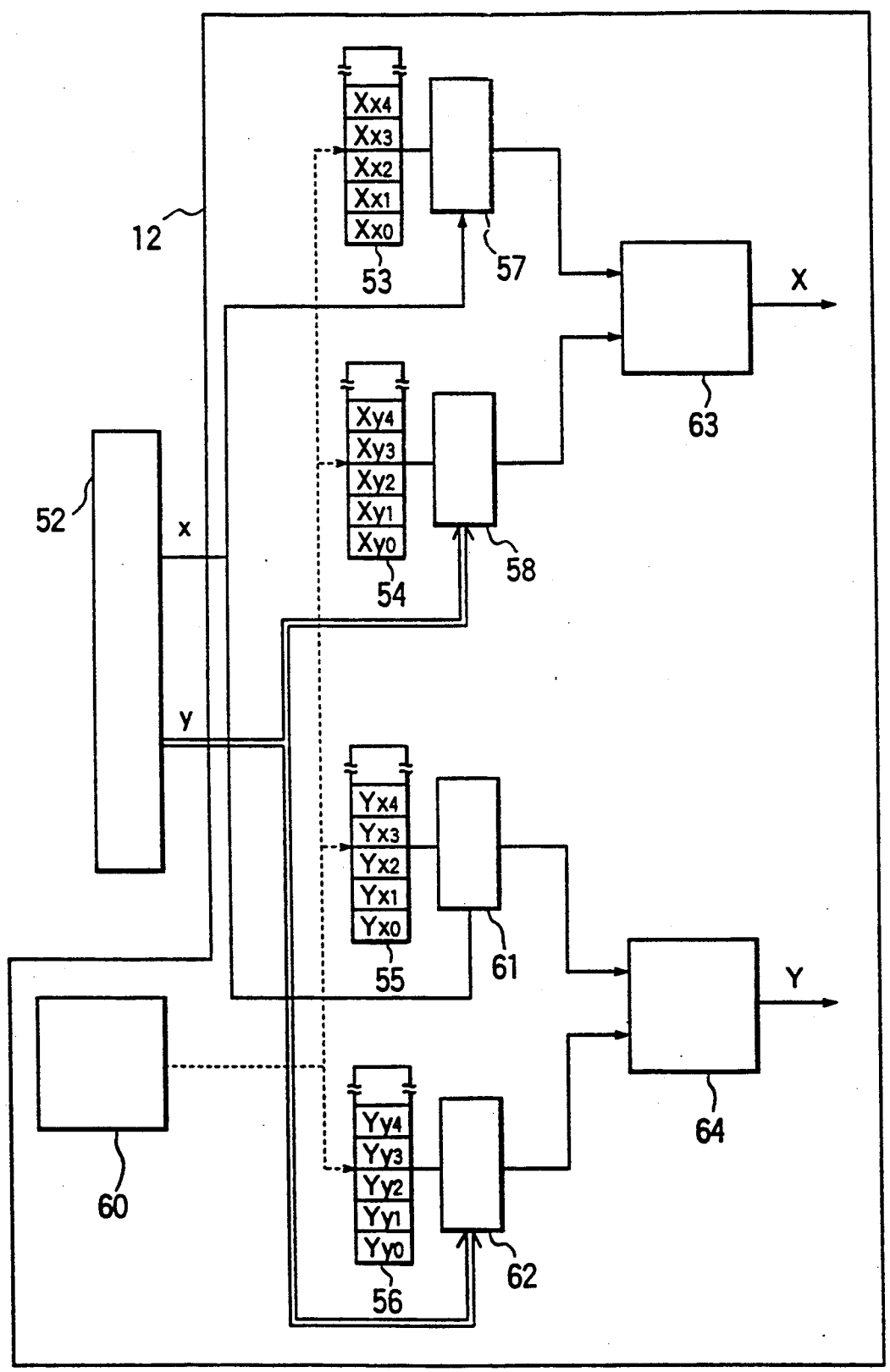
FIG. 9 shows the structure of a two-dimensional coordinate transformation apparatus.

In FIG. 9, reference numeral 12 represents a two-dimensional coordinate transformation apparatus.

The two-dimensional coordinate transformation apparatus 12 is coupled with a two-dimensional coordinate value supplier 52 which can generate coordinate values (x y) of an integer within a predetermined area of the x-y coordinate system, e.g., the area represented by $0 \leq X \leq n$ and $0 \leq y \leq m$.

The value m is the maximum value x of the coordinate values (x, y) of a pixel of a digital image, for example, the value m is an integer 255, and the value n is the maximum value y such as 255.

The two-dimensional coordinate transformation apparatus 1 is provided with an X-x correspondence value table 53, a Y-x correspondence value table 55, an x-y correspondence value table 54, and a Y-y correspondence value table 56. The X-x correspondence value table 53 stores cells $Xx_0$, $Xx_1$, ..., $Xx_n$ representing values $f(0)$, $f(1)$, ..., $f(n)$ for the integer x within the predetermined area, respectively. The Y-x correspondence value table 55 stores cells $Yx_0$, $Yx_1$, ..., $Yx_n$ representing values $h(0)$, $h(1)$, ..., $h(n)$ for the integer x, respectively. The X-y correspondence value table 54 stores cells $Xy_0$, $Xy_1$, ..., $Xy_m$ representing values $g(0)$, $g(1)$, ..., $g(m)$ for the integer y within the predetermined area, respectively. The Y-y correspondence value table 56 stores cells $Yy_0$, $Yy_1$, ..., $Yy_m$ representing values $k(0)$, ..., $k(m)$ for the integer y, respectively.

The values of the X-x, Y-x, X-y, and Y-y correspondence value tables 53, 55, 54, and 56 are calculated by an external processor (CPU) 60 or the like and stored therein, prior to the execution of coordinate transformation.

The two-dimensional coordinate transformation apparatus 12 is also provided with an X-x correspondence value reader 57 for reading the value of each cell $Xx_x$ of the X-x correspondence value table 53 corresponding to the supplied value x, a Y-x correspondence value reader 61 for reading the value of each cell $Yx_x$ of the Y-x correspondence value table 55 corresponding to the supplied value x, an X-y correspondence value reader 58 for reading the value of each cell $Xy_y$ of the X-y correspondence value table 54 corresponding to the supplied value y, and a Y-y correspondence value reader 62 for reading the value of each cell $Yy_y$ of the Y-y correspondence value table 56 corresponding to the supplied value y. The two-dimensional coordinate transformation apparatus 12 is also provided with an X coordinate value calculator 63 for outputting X which is a sum of the values read from the cell $Xx_x$ and the cell $Xy_y$ and a Y coordinate value calculator 64 for outputting Y which is a sum of the values read from the cell $Yx_x$ and the cell $Yy_y$.

Next, the description will be given for the method of transforming the two-dimensional coordinate values (x, y) into the two-dimensional coordinate values (X, Y) using the two-dimensional coordinate transformation apparatus 12.

First, the functions $f(x)$, $g(y)$, $h(x)$, and $k(y)$ are determined and set in the tables 53, 54, 55, and 56. Specifically, the values $f(0)$, $f(1)$, $f(2)$, ..., $f(n)$ are stored in the cells $Xx_0$, $Xx_1$, $Xx_2$, ..., $Xx_n$, respectively;

the values $g(0)$, $g(1)$, $g(2)$, ..., $g(m)$ are stored in the cells $Xy_0$, $Xy_1$, $Xy_2$, ..., $Xy_m$, respectively;

the values $h(0)$, $h(1)$, $h(2)$, ..., $h(n)$ are stored in the cells $Yx_0$, $Yx_1$, $Yx_2$, ..., $Yx_n$, respectively; and the values $k(0)$, $k(1)$, $k(2)$, ..., $k(m)$ are stored in the cells $Yy_0$, $Yy_1$, $Yy_2$, ..., $Yy_m$, respectively;

The two-dimensional coordinate value supplier 52 then supplies coordinate values (x, y) of an integer within the area defined by $0 \leq x \leq n$ and $0 \leq y \leq m$ on the x-y coordinate system.

In this case the coordinate values (0, 0), (0, 1), ..., (m, n) are supplied by first setting y=1 and changing x as 0, 1, 2, ..., n, next incrementing the value y by 1 and setting y=2 and changing x as 0, 1, 2, ..., n, then sequentially incrementing the value y by 1 and changing x as 0, 1, 2, ..., n.

Of the supplied coordinate values (x, y), the value x is inputted to the X-x correspondence value table 53 and the Y-x correspondence value table 55 and is read from the X-x correspondence value reader 57 and the Y-x correspondence reader 61 to obtain the values $f(x)$ and $h(x)$ respectively stored in the cells $Xx_x$ and $Yx_x$. The value $f(x)$ is inputted to the x coordinate value calculator 63, and the value $h(x)$ is inputted to the Y coordinate value calculator 64.

On the other hand, the value y is inputted to the x-y correspondence value table 58 and the Y-y correspondence value table 56 and is read from the X-y correspondence value reader 58 and the Y-y correspondence value reader 62 to obtain the values $g(y)$ and $k(y)$ respectively stored in the cells $Xy_y$ $Yy_y$. The value $g(y)$ is inputted to the X coordinate value calculator 63, and the value $k(y)$ is inputted to the Y coordinate value calculator 64.

The X coordinate value calculator 63 adds together the values $f(x)$ and $g(y)$ to output as X the values $f(x)+g(y)$.

The Y coordinate value calculator 64 adds together the values $h(x)$ and $k(y)$ to output as Y the values $h(x)+k(y)$.

In the above manner, the coordinate transformation from the system (x, y) to the system (X, Y) is completed.

Figure 10:
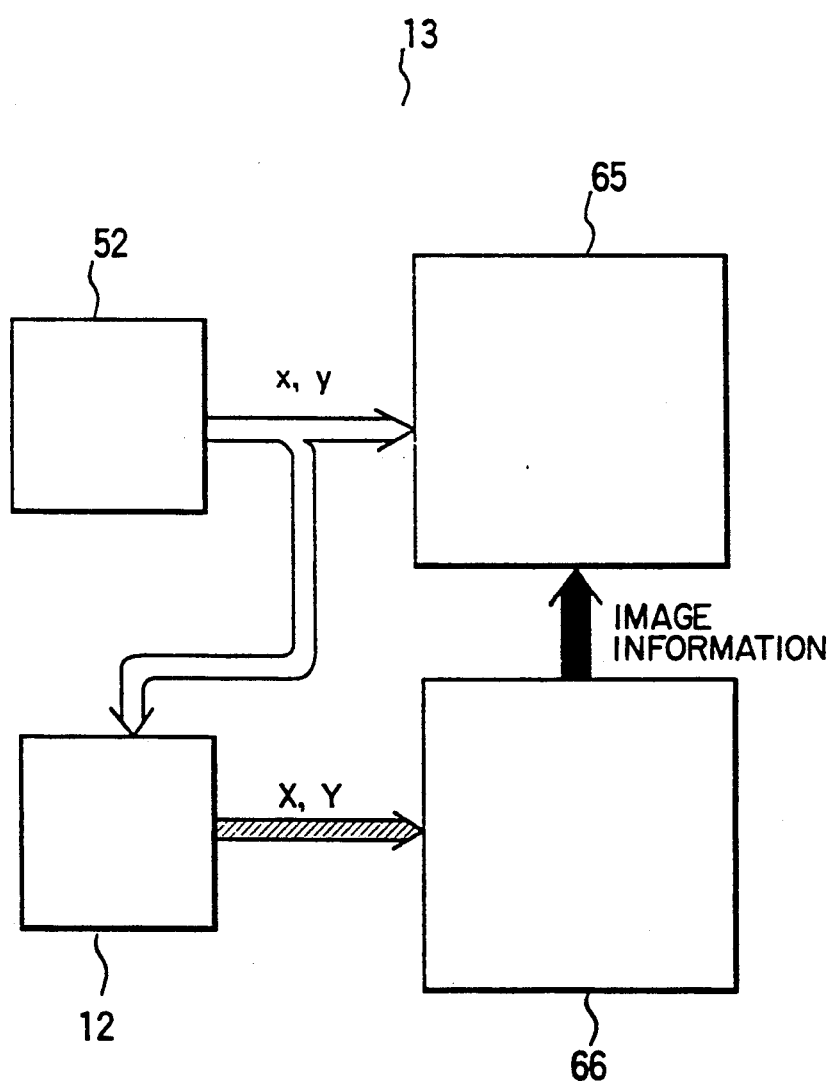
FIG. 10 shows the structure of the image conversion apparatus equipped with the two-dimensional coordinate transformation apparatus.

An image conversion unit 13 shown in FIG. 10 uses the coordinate transformation method and apparatus of this invention. With this image conversion unit 13, the coordinate values (x, y) generated by the two-dimensional coordinate value supplier 52 connected to the two-dimensional coordinate transformation apparatus 12 are sequentially supplied to a converted image writing memory 65 as its two-dimensional address (x, y).

The coordinate values (x, y) are also supplied to the coordinate transformation apparatus 12 to transform them into the coordinate values (X, Y) which are supplied to an original image recording memory 66. Image information (tonal value and the like) stored in the memory 66 at the supplied two-dimensional address (X, Y) is then read therefrom and written in the converted image writing memory 65 at the address (x, y).

An example of such image conversion will be given below.

It is assumed that n=36, m=32, and the function f(x) is set to have a particular value for each x as in the following:

f(0)=0, f(1)=1, f(2)=1, f(3)=2, f(4)=3, f(5)=2,
f(6)=1, f(7)=1, f(8)=4, f(9)=0,
f(10)=0, f(11)=4, f(12)=0, f(13)=0, f(14)=0, f(15)=0,
f(16)=0, f(17)=5, f(18)=6, f(19)=5,
f(20)=0, f(21)=0, f(22)=0, f(23)=0, f(24)=0, f(25)=4,
f(26)=0, f(27)=0, f(28)=4, f(29)=1,
f(30)=1, f(31)=2, f(32)=3, f(33)=2, f(34)=1, f(35)=1,
and f(36)=0.

It is also assumed that the function k(y) is set to have a particular value for each y as in the following:

k(0)=0, k(1)=0, k(2)=1, k(3)=1, k(4)=2, k(5)=3,
k(6)=2, k(7)=1, k(8)=1, k(9)=4,
k(10)=0, k(11)=0, k(12)=4, k(13)=0, k(14)=0, k(15)=5,
k(16)=6, k(17)=5, k(18)=0, k(19)=0,
k(20)=4, k(21)=0, k(22)=0, k(23)=4, k(24)=1, k(25)=1,
k(26)=2, k(27)=3, k(28)=2, k(29)=1,
k(30)=1, k(31)=0, and k(32)=0.

Figure 12:
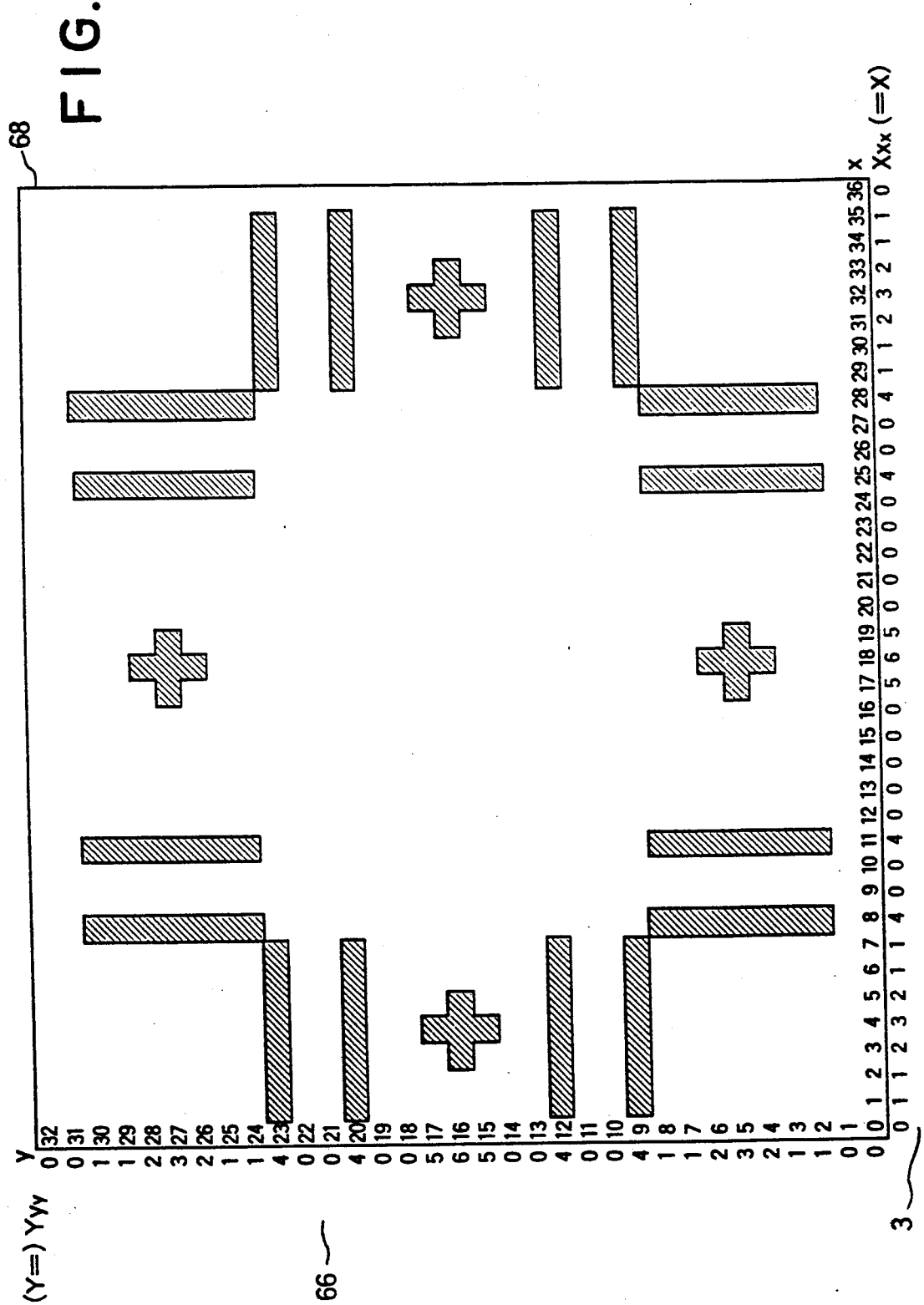
FIG. 12 shows a converted image of the original image shown in FIG. 11.

The relationship between the X-x and Y-y correspondence value tables 53, 56 is shown in FIG. 12. In this example, it is also assumed that g(y)=0, and h(x)=0. Namely, the functions g(y) and h(x) always take a value 0 so that 0 is stored in all the cells Xy$_0$, Xy$_1$, Xy$_2$, ..., Xy$_m$ and all the cells Yx$_0$, Yx$_1$, Yx$_2$, ..., Yx$_n$ respectively of the X-y correspondence value table 54 and the Y-x correspondence value table 56.

Accordingly, the correspondence between X and x is represented only by the X-x correspondence value table 53, and the correspondence between Y and y is represented only by the Y-y correspondence value table 56 (see FIG. 12).

With the above arrangement, the coordinate transformation from the system (x, y) into the system (X, Y) therefore becomes as shown in the following table at the left column.

| (x, y) → | (X, Y) | Image information of Pixel (X, Y) |
|---|---|---|
| (0, 0) → | (0, 0) | 0 |
| (0, 1) → | (0, 0) | 0 |
| (0, 2) → | (0, 1) | 0 |
| (0, 3) → | (0, 1) | 0 |
| (0, 4) → | (0, 2) | 0 |
| (0, 5) → | (0, 3) | 0 |
| . . . | . | . |
| . . . | . | . |
| (1, 0) → | (1, 0) | 0 |
| (1, 1) → | (1, 0) | 0 |
| (1, 2) → | (1, 1) | 0 |
| (1, 3) → | (1, 1) | 0 |
| (1, 4) → | (1, 2) | 0 |
| (1, 5) → | (1, 3) | 0 |
| (1, 6) → | (1, 2) | 0 |
| (1, 7) → | (1, 1) | 0 |
| (1, 8) → | (1, 1) | 0 |

-continued

| (x, y) → | (X, Y) | Image information of Pixel (X, Y) |
|---|---|---|
| (1, 9) → | (1, 4) | 1 |
| (1, 10) → | (1, 0) | 0 |
| . . . | . | . |
| . . . | . | . |
| (2, 0) → | (1, 0) | 0 |
| . . . | . | . |
| . . . | . | . |
| (2, 8) → | (1, 1) | 0 |
| (2, 9) → | (1, 4) | 1 |
| (2, 10) → | (1, 0) | 0 |
| . . . | . | . |
| . . . | . | . |
| (3, 8) → | (2, 1) | 0 |
| (3, 9) → | (2, 4) | 1 |
| (3, 10) → | (2, 0) | 0 |
| . . . | . | . |
| . . . | . | . |
| (4, 8) → | (3, 1) | 0 |
| (4, 9) → | (3, 4) | 1 |
| (4, 10) → | (3, 0) | 0 |
| (4, 11) → | (3, 0) | 0 |
| (4, 12) → | (3, 4) | 1 |
| . . . | . | . |
| . . . | . | . |
| (4, 15) → | (3, 5) | 1 |
| (4, 16) → | (3, 6) | 1 |
| (4, 17) → | (3, 5) | 1 |
| (4, 18) → | (3, 0) | 1 |
| . . . | . | . |
| . . . | . | . |
| (36, 36) → | (0, 0) | 0 |

Figure 11:
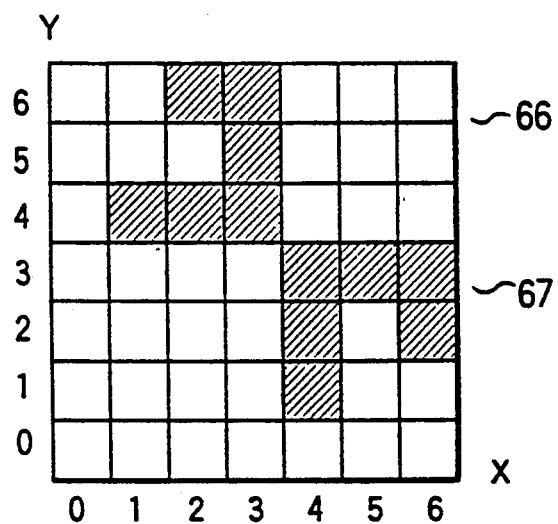
FIG. 11 shows an original image.

A binary image original image 67 shown in FIG. 11 and taking "1" (dark) at an address indicated by shadowed parts is converted into the image 68 shown in FIG. 12.

Specifically, as the (x, y) coordinate values (0, 0), (0, 1), (0, 2), (0, 3), ... are sequentially supplied, the corresponding addresses (X, Y) of the original image recording memory 66 are supplied as (0, 0), (0, 0), (0, 1), (0, 1), ... with the same address being allowed to be supplied plural times. Therefore, the image information 0 (bright), 0 (bright), 0 (bright), (bright), ... is sequentially written in the converted image writing memory 65 at the addresses (0, 0), (0, 1), (0, 2), (0, 3), ... to accordingly obtain the converted image 68 shown in FIG. 12.

Figure 13:
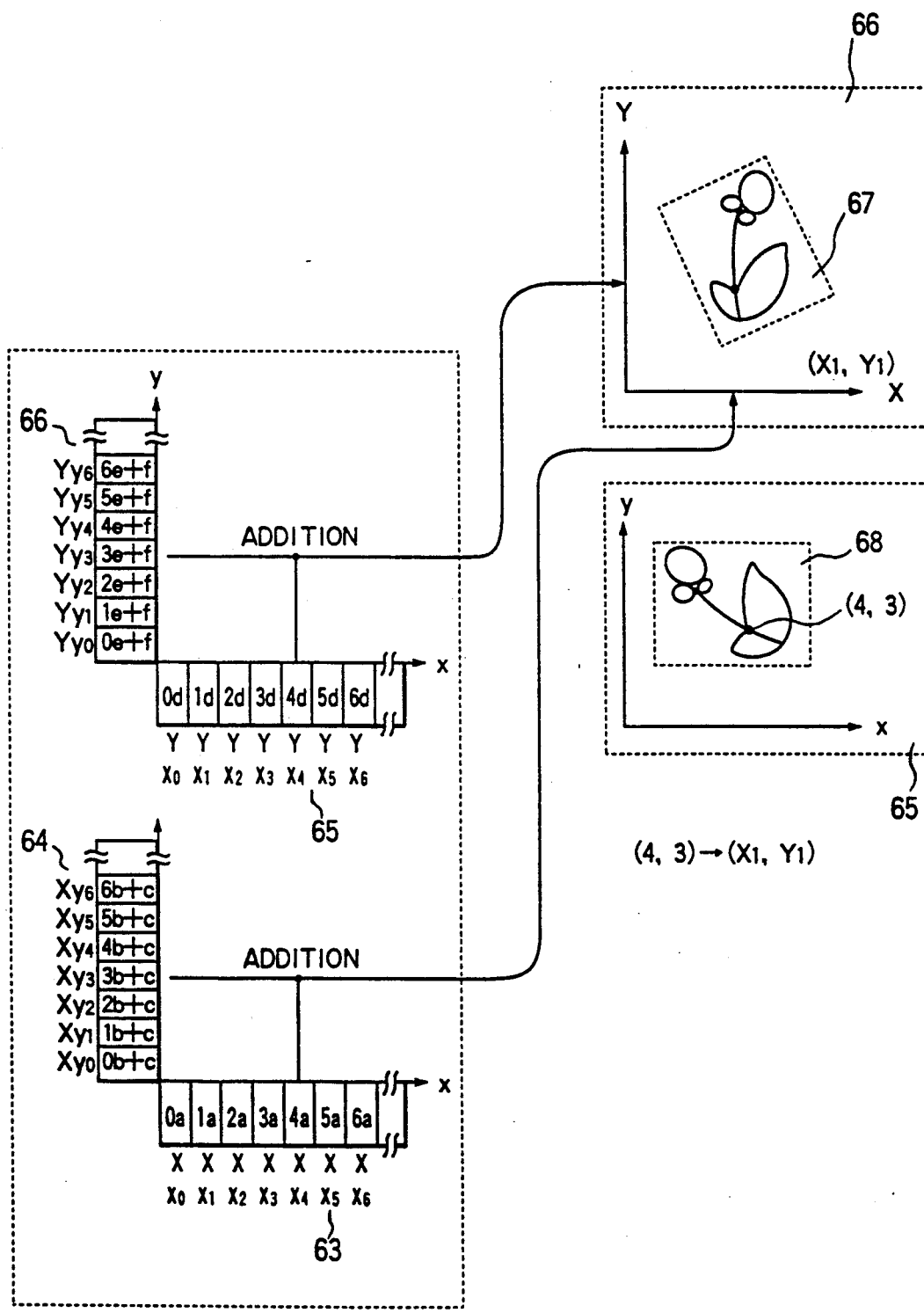
FIG. 13 illustrates how tables are set and the relationship between coordinate values of an original image and a converted image, for the case the two-dimensional coordinate transformation is affine transformation.

FIG. 13 illustrates the values f(x), g(y), h(x), and k(y) of the correspondence value tables where affine transformation of the system (x, y) into the system (X, Y) is executed by the two-dimensional coordinate transformation apparatus 12, with the system (X, Y) being defined by:

$$\left. \begin{array}{l} X = ax + by + c \\ Y = dx + ey + f \end{array} \right\} \quad (1)$$

where a, b, c, d, e, and f are an optional constant.

The equations (1) are obtained by substituting f(x)=ax, g(y)=by+c, h(x)=dx, and k(y)=ey+f into $$X = f(x) + g(y) \brace Y = h(x) + k(y)} \qquad (2)$$

The values are therefore set as shown in FIG. 13 for the X-x correspondence value table 53, X-y correspondence value table 54, Y-k correspondence value table 55, and Y-y correspondence value table 56. The point (4, 3) on the x-y coordinate system is transformed into a point $(X_1, Y_1)$ where $X_1=4a+3b+c$ and $Y_1=4d+3e+f$. Thus, the image information of the original image recording memory 66 at the address $(X_1, Y_1)$ is written in the converted image writing memory 65 at the address (4, 3) so that an original image 67 is changed to a converted image 68 as shown in FIG. 13.

If the affine transformation is rotation, the constants a, b, c, and d take a decimal number with fraction part between $-1$ to 1. Therefore, the tables for f(x), g(y), h(x) and k(y) are used which can store decimal numbers with fraction part. The values of the addition results X and Y are round down to obtain integers X' and Y'.

Figure 14A:
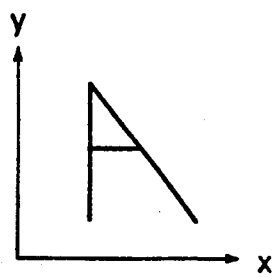
FIGS. 14a-g show various images converted by the two-dimensional coordinate transformation apparatus.
Figure 14B:
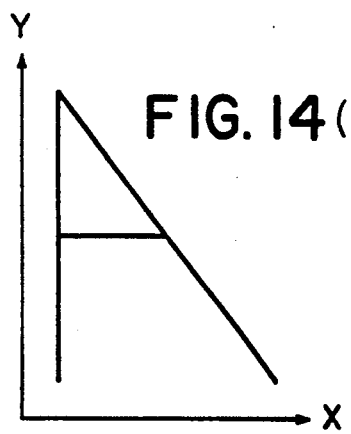
Figure 14C:
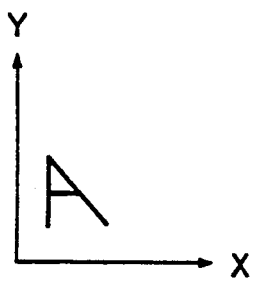
Figure 14D:
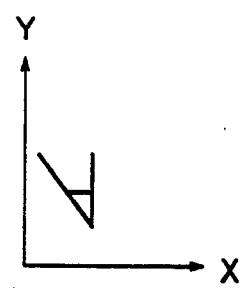
Figure 14E:
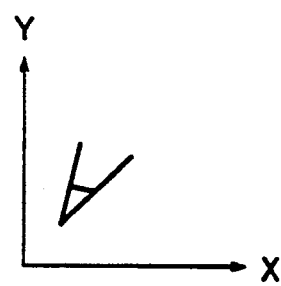
Figure 14F:
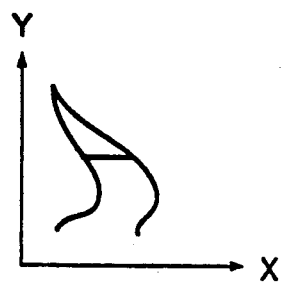
Figure 14G:
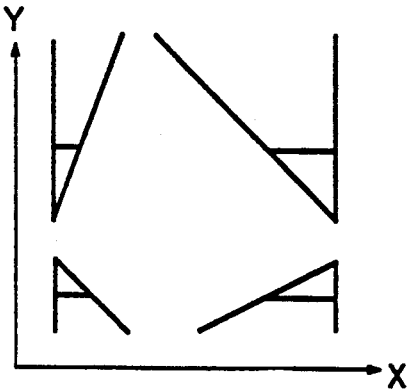
Figure 15:
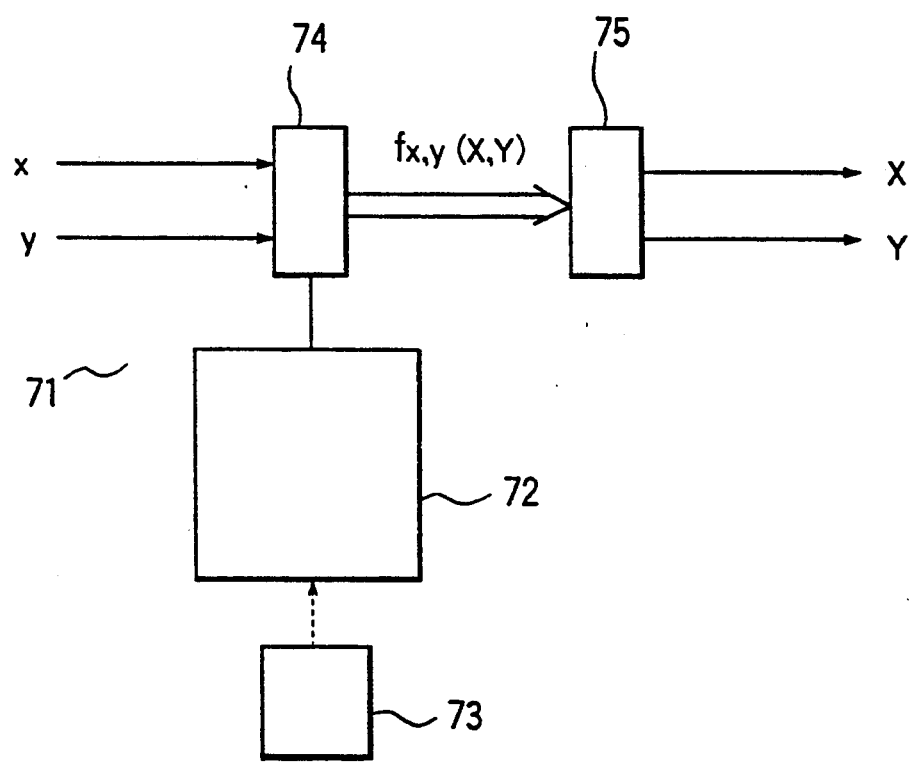

FIGS. 14(a) to 14(g) show examples of various images converted by the image modification unit 13 wherein an original image is indicated at FIG. 14(a), and converted images are indicated at FIGS. 14(b) to 14(g).

As appreciated from the foregoing description, not only affine transformation used for ordinary image editing such as magnification, reduction, rotation, parallel displacement, and a combination thereof, but also other transformations of higher degree of freedom can be achieved in a short time. Specifically an optional input coordinate values (x, y) can be transformed in a short time into the coordinate system (X, Y) satisfying the equations $$X = f(x) + g(y)$$
$$Y = h(x) + k(y)$$

where f(x) and h(x) are an optional function of x, g(y) and h(y) are an optional function of y, and the values x and y are an integer taking a value within a predetermined range. Thus, it is possible to obtain a two-dimensional coordinate transformation method and apparatus capable of shortening the coordinate transformation time without using a bulky apparatus. It is also possible to realize an image converter capable of converting a number of images at high speed, by using the two-dimensional coordinate transformation method and apparatus of this invention.

Next, the description will be given for the coordinate transformation method and apparatus, and the image conversion method, according to the eighth to tenth inventions.

Figure 15:
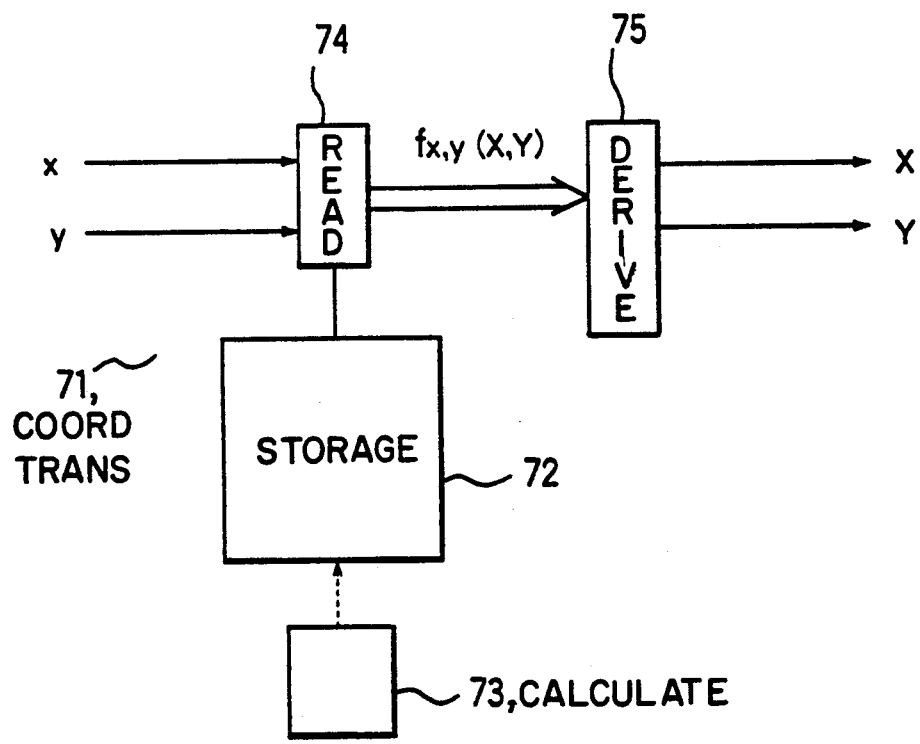
FIG. 15 is a block diagram showing the coordinate transformation apparatus.

Referring to FIG. 15, reference numeral 71 represents a coordinate transformation apparatus according to the eighth and ninth inventions. The coordinate transformation apparatus 71 is equipped with a storage device 72 having coordinate values (x, y) as its addresses. Coordinate values (X, Y) transformed from the coordinate values (x, y) are previously obtained by another means such as a CPU, and stored in the storage device 72 at corresponding addresses (x, y). Data stored in the storage device 72 is expressed as a function $f_{x,y}(X, Y)$ by which X and Y can be easily derived separately. An example of such a function $f_{x,y}(X, Y)$ is $$f_{x,y}(X, Y) = x \ast 2^a + Y \qquad (3)$$

where X and Y are expressed by a binary value, and $\alpha$ is an integer larger than the number of digits of Y.

Figure 16A:
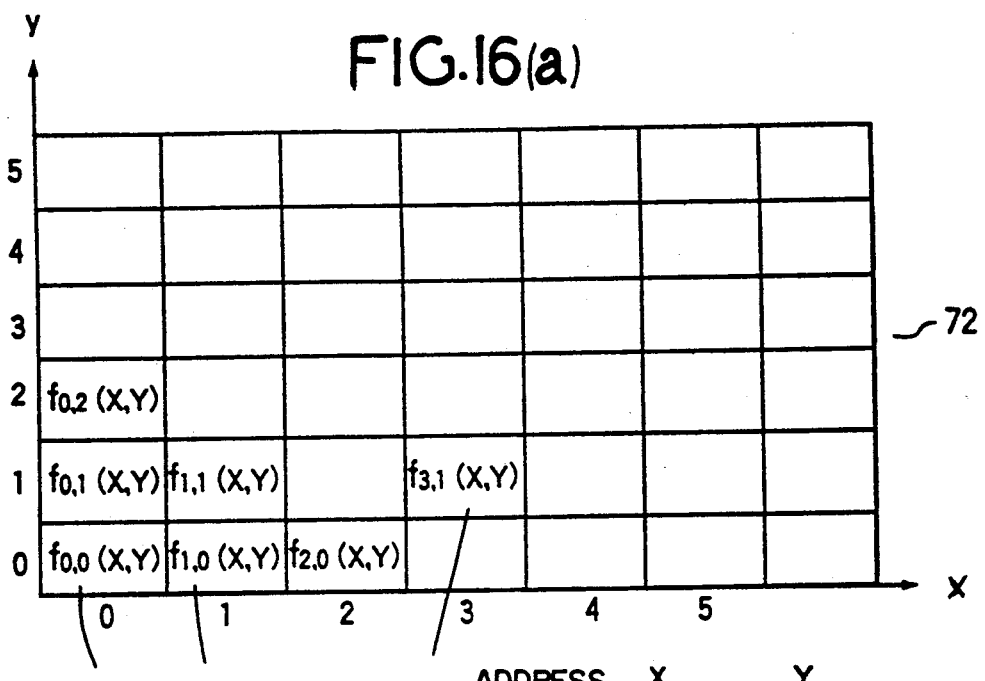
FIG. 16(a) and FIG. 16(b) illustrate the relationship between data $f_{x,y}(X, Y)$ and address (x, y) of a memory unit.
Figure 16B:
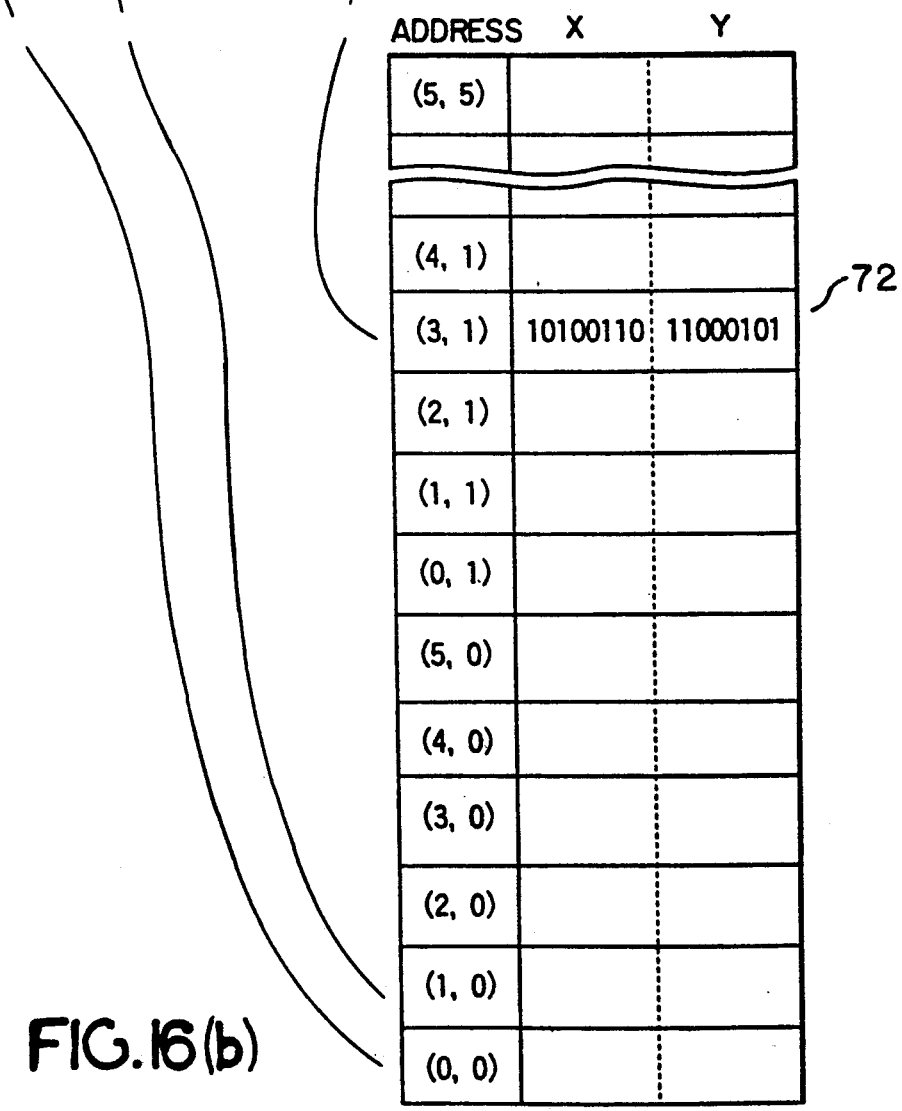

If $\alpha$ is set as $\alpha=8$, and assuming that X=10100110 and Y=11000101 for x=3 and y=1 as shown in FIG. 16(a) and FIG. 16(b), then $f_{3,1}(X, Y)$=1010011011000101, the upper eight digits representing X and the lower eight digits representing Y. In this case, it is easy to separately derive X and Y from $f_{3,1}(X, Y)$. Namely, the value of the function $f_{x,y}(X, Y)$ is divided by 100000000 (binary value), and the quotient is used as X and the remainder is used as Y.

In the equation (3), although the function $f_{x,y}(X, Y)$ is a function of X and Y and is not related to x and y, the function having a relation to x and y may also be used, for example:

$$f_{x,y}(X, Y) = x \ast 2^a + Y + x + y \qquad (4)$$

In this case, first the value of the function is subtracted by $x+y$, then the above-described calculation is carried out to separately derive X and Y.

It can be considered various types of the function $f_{x,y}(X, Y)$ which can separately derive X and Y upon input of x and y. The above example is most simple. It is obvious that a function which can not derive X and Y cannot be used, such as a function $f_{x,y}(X, Y)=X+Y$.

The storage device 72 may use any type of memories only if it can be accessed by the two-dimensional address (x, y). For example, the memory shown in FIG. 16 may be used whose memory cells are disposed in a one-dimensional array.

The storage device 72 stores the transformed coordinate values (X, Y) in the form of the function $f_{x,y}(X, Y)$. The transformed values are not associated with the type or contents of the (x, y) to (X, Y) transformation equation, and the calculation of the value of the function $f_{x,y}(X, Y)$ is executed by a calculating device 73 if necessary.

The coordinate transformation apparatus 71 is also provided with a reader 74 for reading the data of the function $f_{x,y}(X, Y)$ from the storage device 72 at the inputted address (x, y).

The coordinate transformation apparatus 71 is also provided with X-Y coordinate value reader 75 for separately deriving X and Y from the data of the function $f_{x,y}(X, Y)$. In the above example, the XY coordinate value pickup device 75 is and reader which can separately derive and output the quotient and remainder by dividing the data of the function $f_{x,y}(X, Y)$ by binary value 100000000. Generally, the XY coordinate value pickup device 75 can use a reader of the type that X and Y can be separately derived with simple calculation matching the type of the function $f_{x,y}(X, Y)$. It is desirable that the type of the function $f_{x,y}(X, Y)$ is not too much complicated and it takes less time to separately derive X and Y, from the viewpoint of the aspect of this invention. However, in principle, any function may be used if only X and Y can be separately outputted. The type of the XY coordinate value pickup device 75 is determined in accordance with the function $f_{x,y}(X, Y)$.

The image conversion method of the tenth invention will be described.

Figure 17:
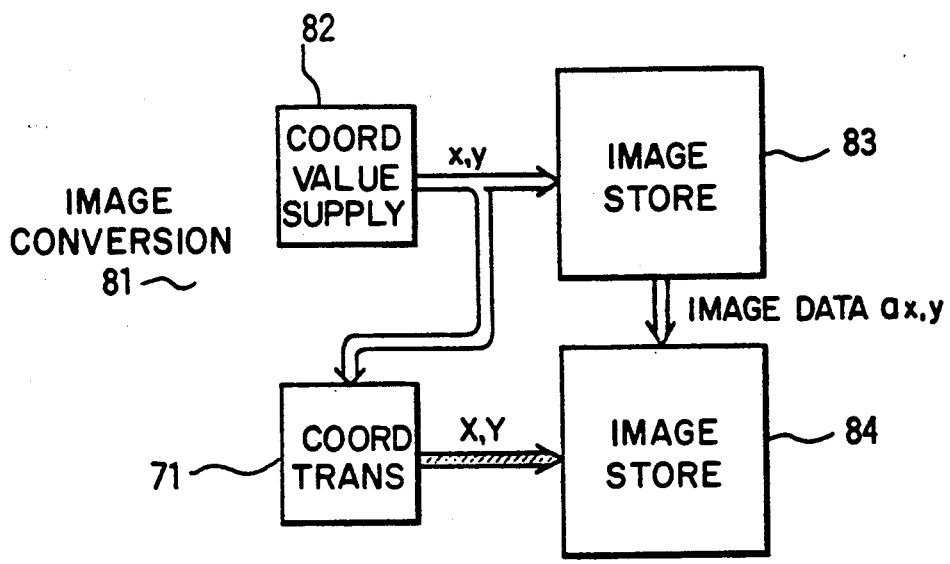
FIG. 17 shows the apparatus used for practicing the image conversion method of this invention.

Referring to FIG. 17, reference numeral 81 represents an image conversion unit for practicing the image conversion method of this invention. The image conversion unit 81 is constructed of a coordinate value supplier 82, a coordinate transformation apparatus of this invention 71, and two image storage devices 83 and 84.

The coordinate value supplier 82 can sequentially generate coordinates values (0, 0), (1, 0), (2, 0), . . . , (n, 0), (0, 1), (1, 1), (2, 1), . . . (n, 1), (0, 2), (1, 2), . . . , (n, 2), . . . , (n, m), within the necessary area of the x-y coordinate system.

Figure 18:
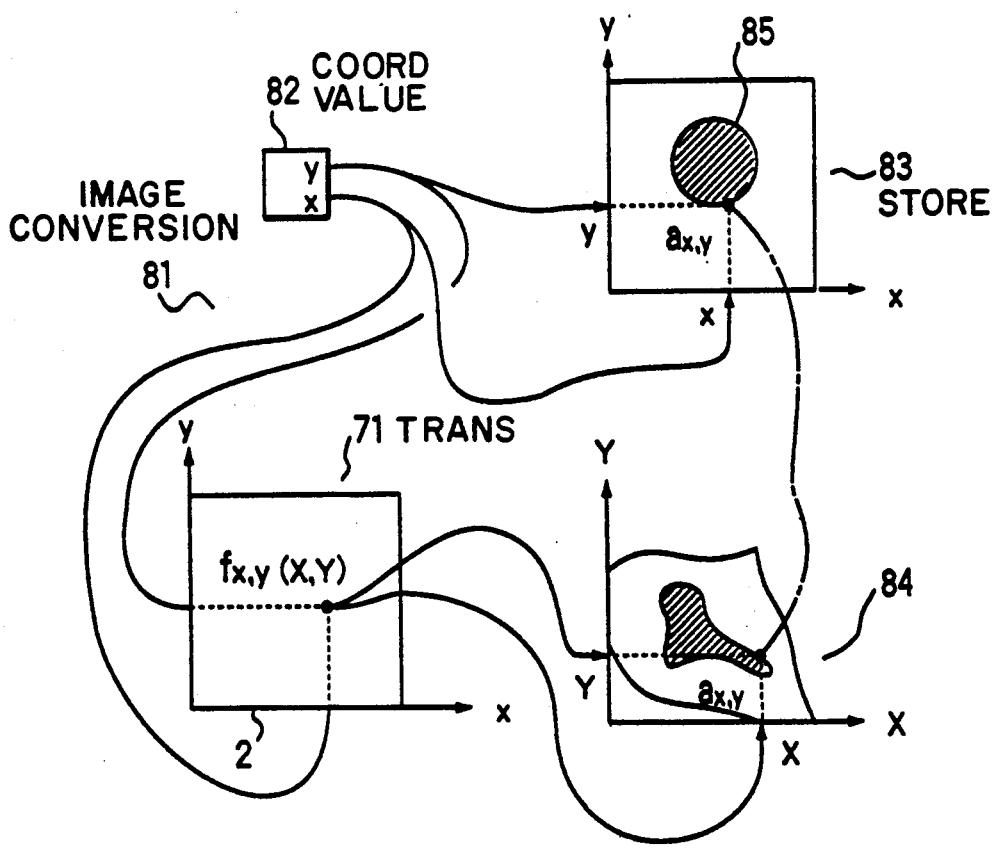
FIG. 18 illustrates the relationship between an image and addresses (x, y) and (X, Y) in the apparatus shown in FIG. 17.

The generated coordinate values (x, y) are supplied to the coordinate transformation apparatus 71 to be transformed into the coordinate values (X, Y), and also supplied to the image storage devices 83. The image storage device 83 stores an original image 85 as shown in FIG. 18. The image data $a_{x, y}$ is read from the image storage device 83 at the supplied address (x, y).

The output (X, Y) from the coordinate transformation apparatus 71 is supplied to the image storage device 84 to thereby write the read-out image data therein at the address (X, Y). The above operations are repeated for all values (x, y) to complete image conversion.

In the above example, the address (x, y) is used for reading the original image. Instead, the address (X, Y) may be used for reading the original image. In such a case, an original image is stored in the image storage device 84 and the image data at the address (X, Y) is written in the image storage device 83 at the address (x, y).

Figures 19, 20A, 20B, 20C:
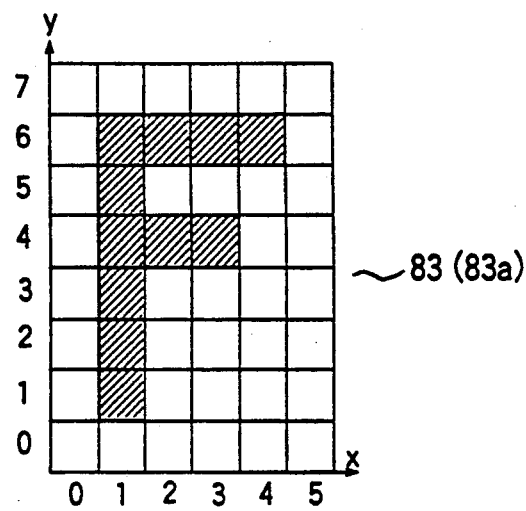
FIG. 19 shows an original image.
FIGS. 20(a) to 20(c) illustrate a memory unit wherein the data of $f_{x,y}(X, Y)$ to be stored at the address (x, y) is expressed as decimal values X and Y, with different examples being shown in FIGS. 20(a) to 20(c)
Figure 21A:
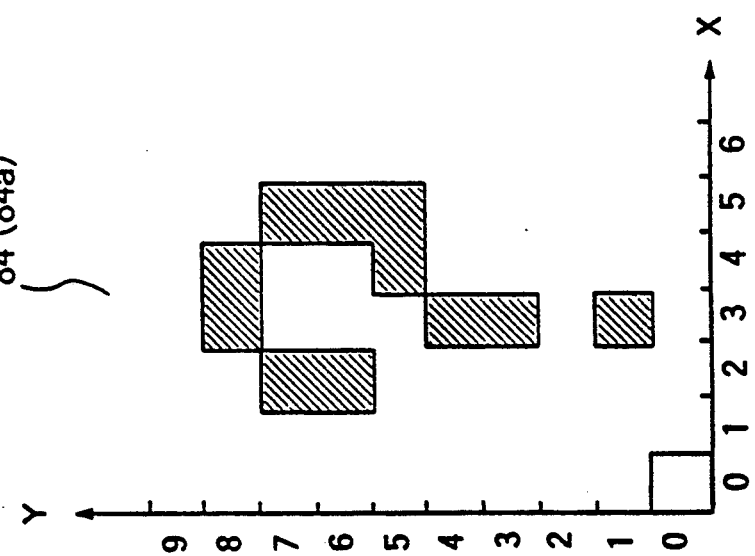
FIGS. 21(a) to 21(c) show converted images when values X and Y shown in FIGS. 20(a) to 20(c) are outputted.
Figure 21B:
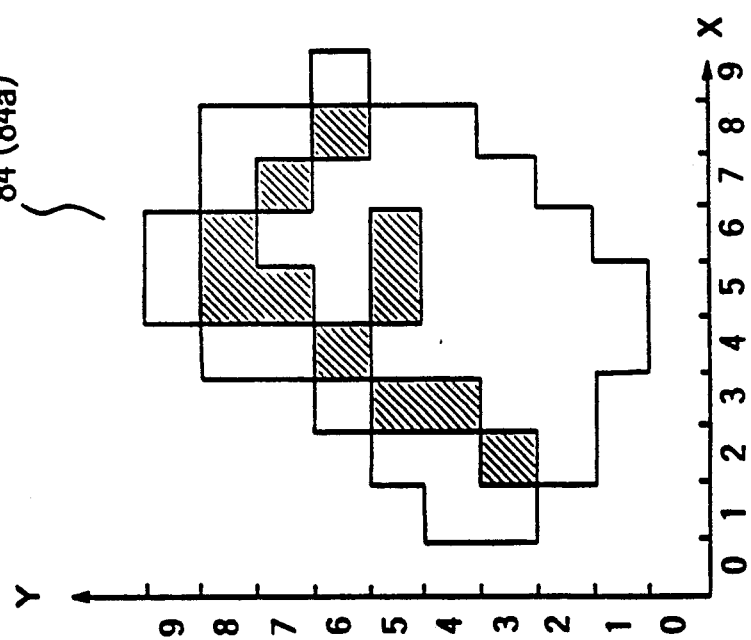
Figure 21C:
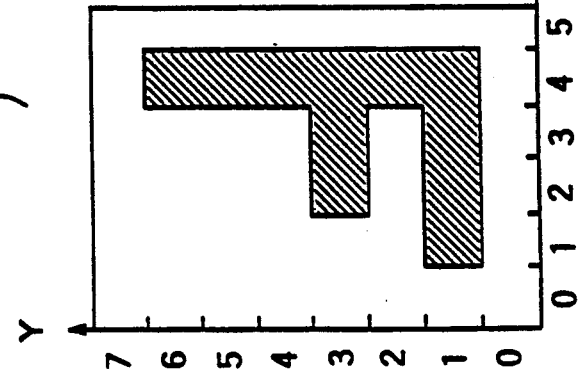

Next, examples of converted images by the image conversion method of the tenth invention will be given. FIG. 19 shows an original image. FIGS. 20(a) to 20(c) show three different examples FIG. 20(a), FIG. 20(b), and FIG. 20(c) of the values X and Y, in the decimal notation from the XY coordinate value pickup device. FIGS. 21(a) to 21(c) show the converted images using the outputs X and Y of FIG. 20(a), FIG. 20(b), and FIG. 20(c) If the original image of FIG. 19 is a binary value image, the images of FIGS. 2a) to 21(c) are binary images, whereas if the original image is a multi-value image, the images of FIGS. 21(a) to 21(c) are multi-value images.

Figure 22A:
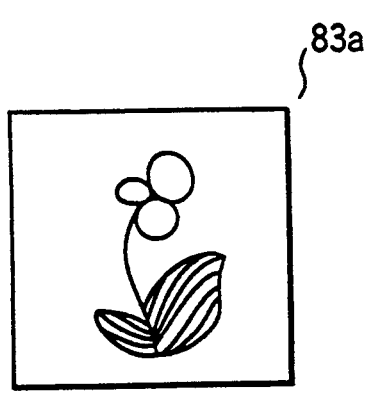
Figure 22B:
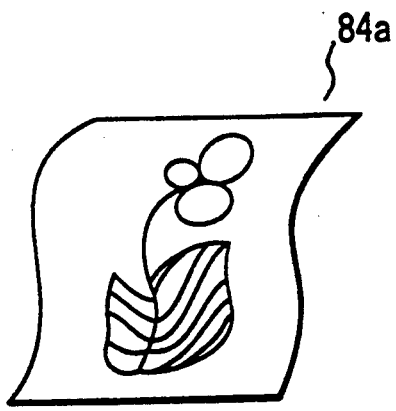
Figure 22C:
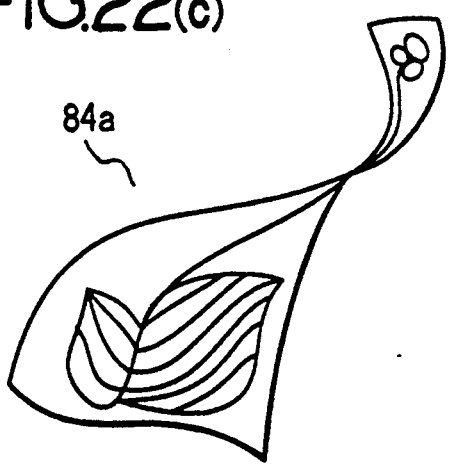
Figure 22D:
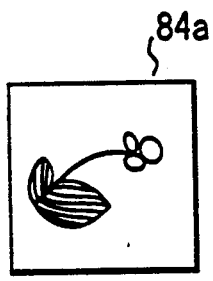
Figure 22E:
Figure 22F:
Figure 22G:
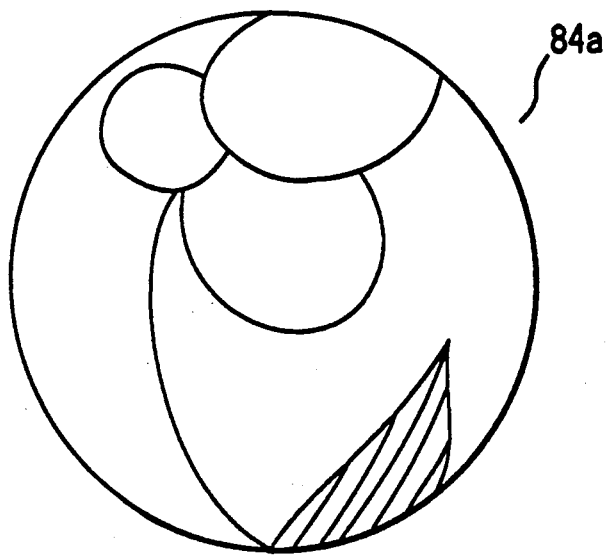

FIGS. 22(a) to 22(g) show other examples of converted image using the image conversion apparatus 81. FIG. 22(a) shows an original image 83a, and FIGS. 22(b) to 22(g) show converted images 84a.

Figure 23:
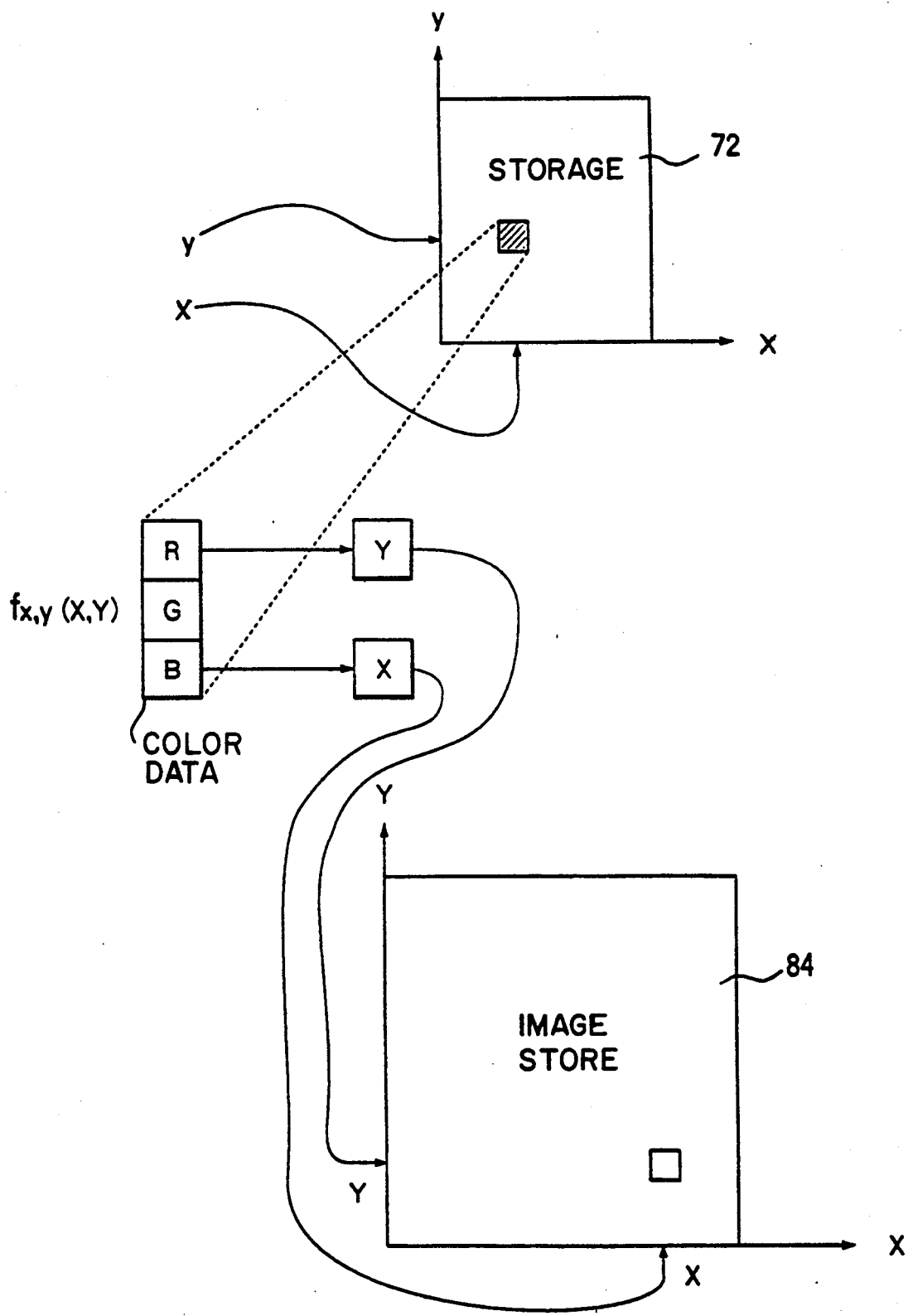
FIG. 23 illustrates an embodiment wherein as the data of $f_{x,y}(X, Y)$ the data read with a color scanner is used.

As described previously, the correspondence between (x, y), and (X, Y) can be arbitrarily set, and the data of the function $f_{x, y}(X, Y)$ allowing separate derivation of X and Y is stored in the storage device 72 at the address (x, y). In this connection, it is possible to use, as the data of the function $f_{x, y}(X, Y)$, image data of a pixel at the coordinate point (x, y) read with, for example, a color scanner. Such image data is constructed of three primary color data R, G and B of multi-tone values. As shown in FIG. 23, if the R data is used as Y and the B data is used as X for image conversion, there is obtained a converted image which cannot be obtained by the above-described ordinary image conversion. In this case, an image read with the color scanner or another image may be used as the original image.

If one of the image storage devices 83 and 84 of the image conversion apparatus 81 and the reader 84 and XY coordinate value pickup unit 71 of the coordinate transformation apparatus 81 has a function to affine-transform the system (x, y) or (X, Y) to be supplied to or outputted therefrom, then a converted image can have the characteristic of the transformation of (x, y) into (X, Y) as well as of the affine transformation.

As appreciated from the foregoing description, according to the present invention, coordinate transformation can be executed at high speed which is necessary for converting, such as moving and deforming, a digital image as desired. Therefore, not only affine transformation but also other transformations of higher degree of freedom can be executed at high speed. Furthermore, if a same transformation is conducted for a plurality of images, it is not necessary to calculate the coordinate transformation each time a different image is used, but the results calculated once can be used for a plurality of images at very high speed as many times as desired. As above, the present invention allows to provide the coordinate transformation method and apparatus and the image conversion method, having the above characteristic features.

Next, the inter-pixel data calculation apparatus of the eleventh invention will be described.

Figure 24:
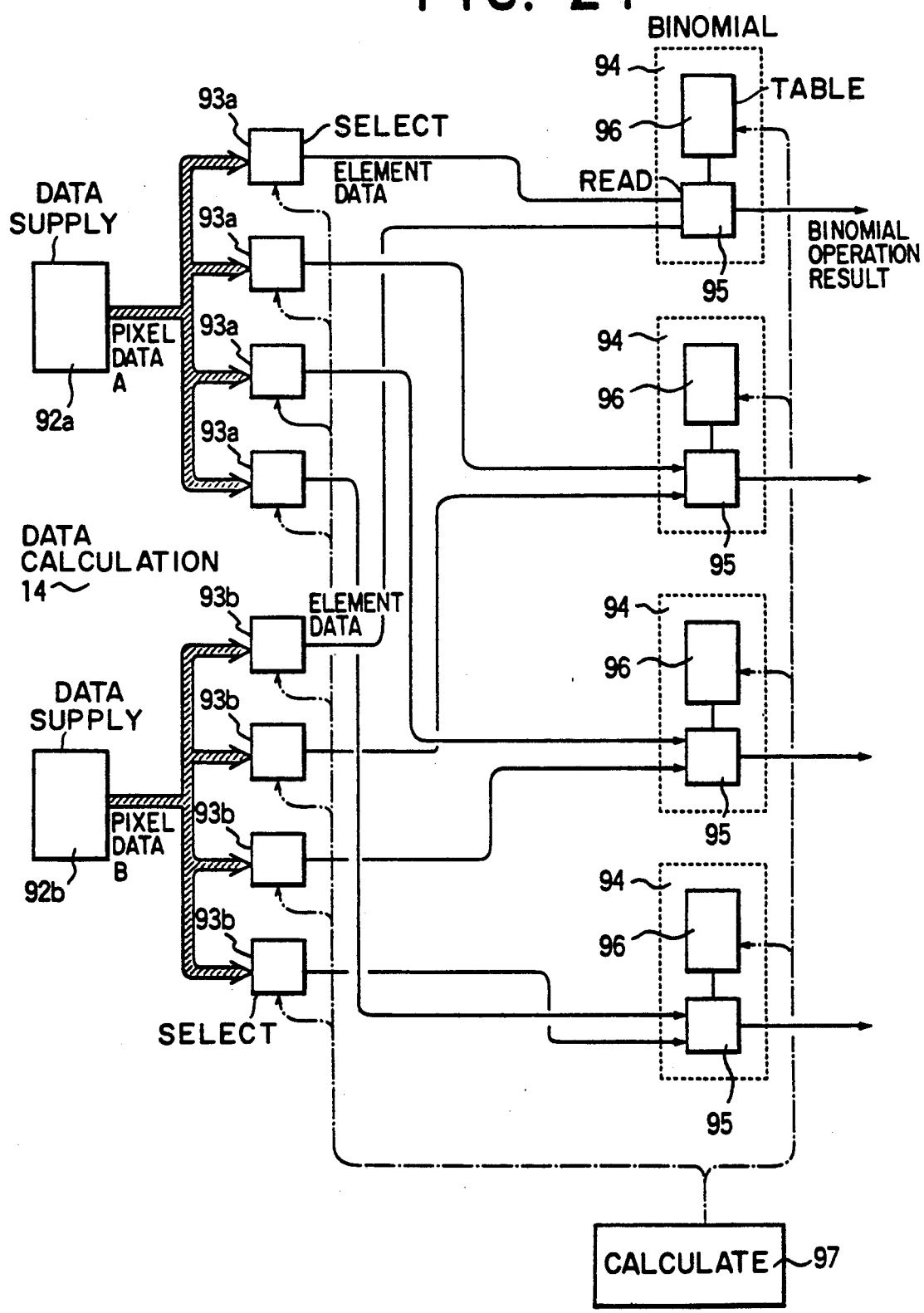
FIG. 24 is a block diagram of the inter-pixel data calculation apparatus of this invention.

Referring to FIG. 24, reference numeral 14 represents an inter-pixel data calculation apparatus which is constructed of a pixel data supplier 92a for supplying a pixel data A, and a pixel data supplier 92b for supplying a pixel data B.

The pixel data A and pixel data B each are, for example, composed of four element data Y (yellow), M (magenta), C (cyan), and K (black). Each element data takes as a tonal value one of 256 values including 0, 1, 2, . . . , and 255.

Connected at the output side of the pixel data supplier 92a are a plurality of, for example, four element data selectors 93a. Each of the element data selectors 93a selects a desired one of four element data from the pixel data A. The element data to be selected is previously set by a calculator 97 in accordance with what type of binomial operation is to be executed.

Similarly, connected at the output side of the pixel data supplier 92b are a plurality of, for example, four element data selectors 93b. Each of the element data selectors 93b selects a desired one of four element data from the pixel data B. The element data to be selected is previously set by the calculator 97 in accordance with what type of binomial operation is to be executed.

The outputs of one element data selector 93a and one element data selector 93b are coupled to a binomial operation device 94 for performing a binomial operation between the two element data. Each binomial operation device 94 is constructed of an operation result table 96 and a reader 95.

The operation result table 96 is a memory for storing an operation result corresponding to two element data which are used as an address to access the memory.

Values of the operation result table 96 are set for example by the calculator 97. Specifically, the calculator 97 determines the type of calculation of the binomial operation and executes the binomial operation of the determined type for all pairs of selected two element data.

The reader 95 accesses the operation result table 96 by using the designated address to thereby read and output the stored operation result.

Figure 25:
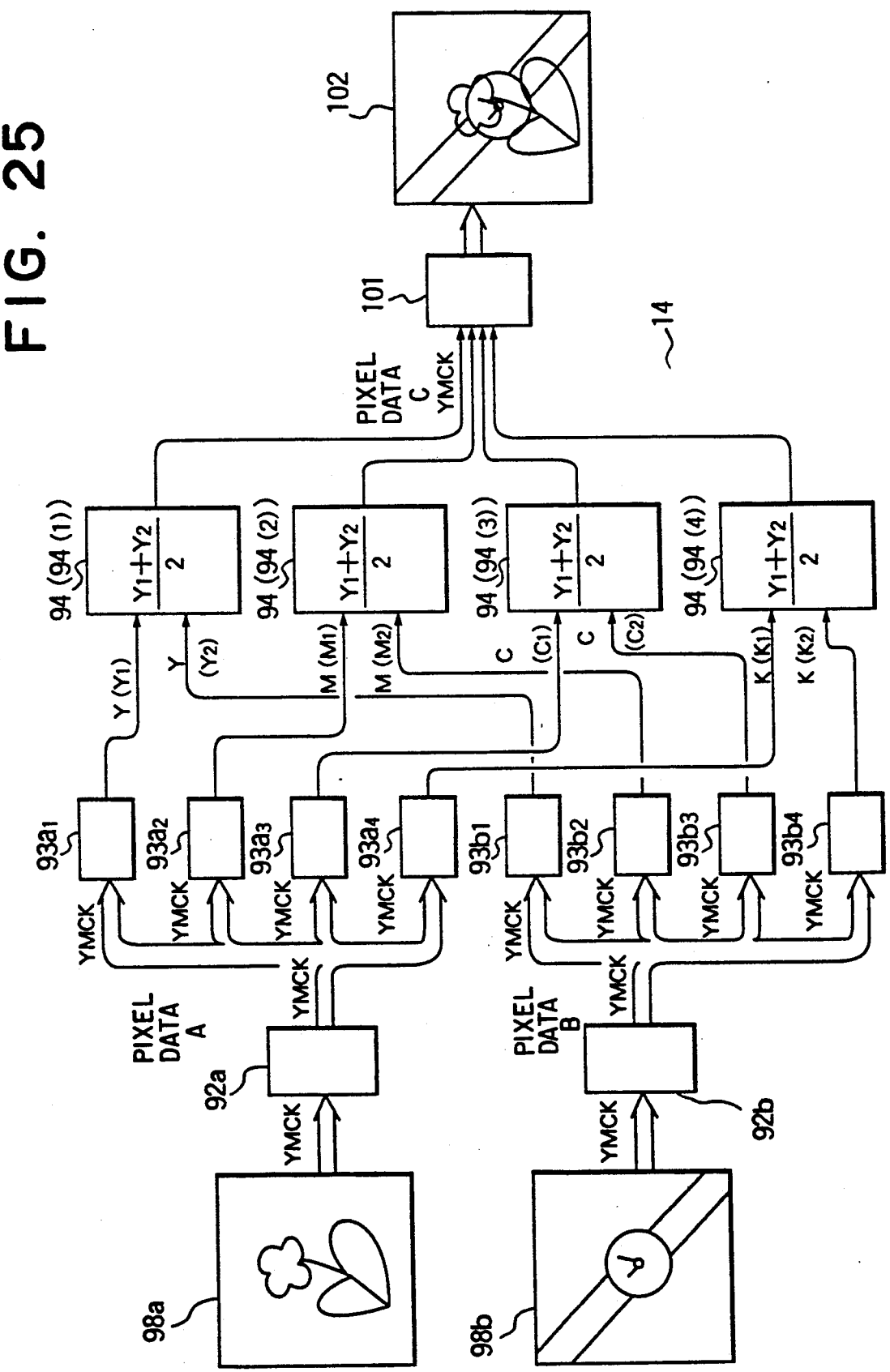
FIG. 25 is a schematic illustration in block form explaining a method of obtaining a transparent overlapped image by using the inter-pixel data calculation apparatus shown in FIG. 24.

FIG. 25 illustrates, taking transparent overlapped image as an example, how the element data selectors 93a, and 93b of the inter-pixel data calculation apparatus 14 select the element data, and how the binomial operation device 94 determines the type of calculation. The transparent overlapping of image obtains a transparent overlapped image 102 from two original images 98a and 98b transparently overlapped one upon the other.

Specifically, the four element data selectors 93a (93a₁, 93a₂, 93a₃, 93a₄) select the values Y, M, C, and K (Y₁, M₁, C₁, and K₁) among the four element data of the pixel A of the original image 98a. The four element data selectors 93b₁, 93b₂, 93b₃, 93b₄) select the values Y, M, C, and K (Y₂, M₂, C₂, and K₂) among the four element data of the pixel B of the original image 98b. Of the four binomial operation devices 94 (94(1), 94(2) 94(3), 94(4)), the binomial operation device 94(1) receives Y₁ and Y₂ outputted from the element data selectors 93a₁ and 93b₁ to output (Y₁+Y₂)/2, the binomial operation device 94(2) receives M₁ and M₂ outputted from the element data selectors 93a₂ and 93b₂ to output (M₁+M₂)/2, the binomial operation device 94(3) receives C₁ and C₂ outputted from the element data selectors 93a₃ and 93b₃ to output (Y₁+Y₂)/2, the binomial operation device 94(4) receives Y₁ and Y₂ outputted from the element data selectors 93a₄ and 93a₄ to output (K₁+K₂)/2. The outputs from the binomial operation devices 94(1), 94(2), 94(3) and 94(4) are combined the obtain a pixel data C including four element data. The above operations are carried out for all pixels so that the pixel data C forms the transparent overlapped image 102 on an image display device.

Figure 26:
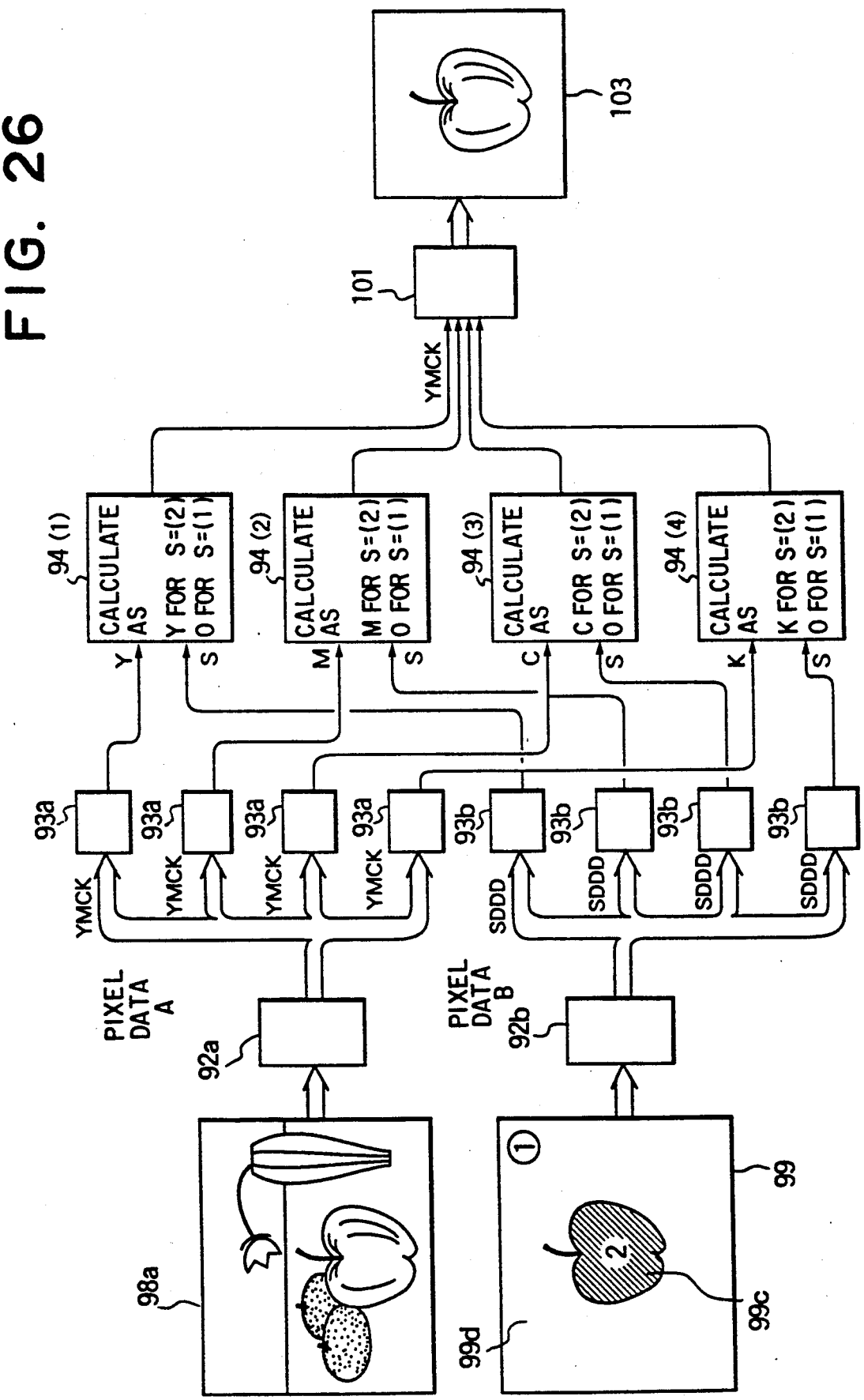
FIG. 26 is a schematic illustration in block form explaining a method of obtaining a crop-masked image by using the inter-pixel data calculation apparatus shown in FIG. 24.

FIG. 26 illustrates, taking crop-masking using a mask as an example, how the data selectors 93a and 93b select the element data, and how the binomial operation device 94 determines the type of calculation.

For crop-masking an image by using a mask, there are provided an original image 93a and a masking image 99. A crop-masking image 103 is obtained by leaving the image data of the original image 98a corresponding to a masking area 99c of the mask image, and removing the image data corresponding to an area 99d other than the masking area.

The masking image 99 is formed by pixels of a designated color (2) within the masking area 99c and pixels of another designated color (1) within the area 99d other than the masking area. The designated colors (1) and (2) are different from each other which are selected from colors registered by an image display device.

The four element data selectors 93a (93a₁, 93a₂, 93a₃, 93a₄) select Y, M, C, and K of the four element data of the pixel data A, whereas the four element data selectors 93b (93b₁, 93b₂, 93b₃, 93b₄) select the element data of the designated colors of the pixel data B of the masking image 99.

The pixel data A and B each are represented by 32 bits for example. In this case, the pixel data A is composed of four element data Y, M, C and K respectively represented by 8 bits starting from the highest bit. The pixel data B is composed of S, D, D, and D, S being the upper 8 bits discriminating the designated colors (1) and (2), and D being dummy bits.

The binomial operation device 94(1) outputs, as the calculation result, Y when S is the designated color (2), and 0 when S is the designated color (1). The binomial operation device 94(2) outputs, as the calculation result, M when S is the designated color (2), and 0 when S is the designated color (1). The binomial operation device 94(3) outputs, as the calculation result, C when S is the designated color (2), and 0 when S is the designated color (1). The binomial operation device 94(4) outputs, as the calculation result, K when S is the designated color (2), and 0 when S is the designated color (1).

The outputs of the binomial operation devices 94(1), 94(2), 94(3), and 94(4) are inputted to the pixel data synthesizer 101 to obtain a pixel data C.

The obtained pixel data C is composed of the pixel data A of the original image 98a for those pixels within the masking area 99c, and 0 for those pixels within the area 99d outside the masking area.

FIG. 27 shows an example of data set in the calculation result table 96. For example, assuming that the binomial operation at the binomial operation device 94(1) is:

$$\sqrt{Y_1^2 + Y_2^2} , \qquad (5)$$

the operation result of the equation (5) is stored in the table 96 at the address defined by a combination of $Y_1$ and $Y_2$. The value $Y_1$ and $Y_2$ each take one of the values 0, 1, 2, ..., 255. The address for a given ($Y_1$, $Y_2$) is set as $Y_1*256+Y_2$, and the fraction part of the calculation result is round down to obtain an integer.

As appreciated from the foregoing description, according to the present invention, the inter-pixel data calculation can be achieved simply by reading the calculation result table in which the result of the binomial operation of the element data picked up from two pixel data is stored at the address defined by a combination of the element data. Furthermore, a desired combination of types of element data is allowed, and a plurality of binomial operations can be executed in parallel. Therefore high speed image processing is possible with high speed binomial operations of a high degree of freedom while considering the characteristics of images.

Next, a memory unit according to the twelfth invention will be described.

Figure 28:
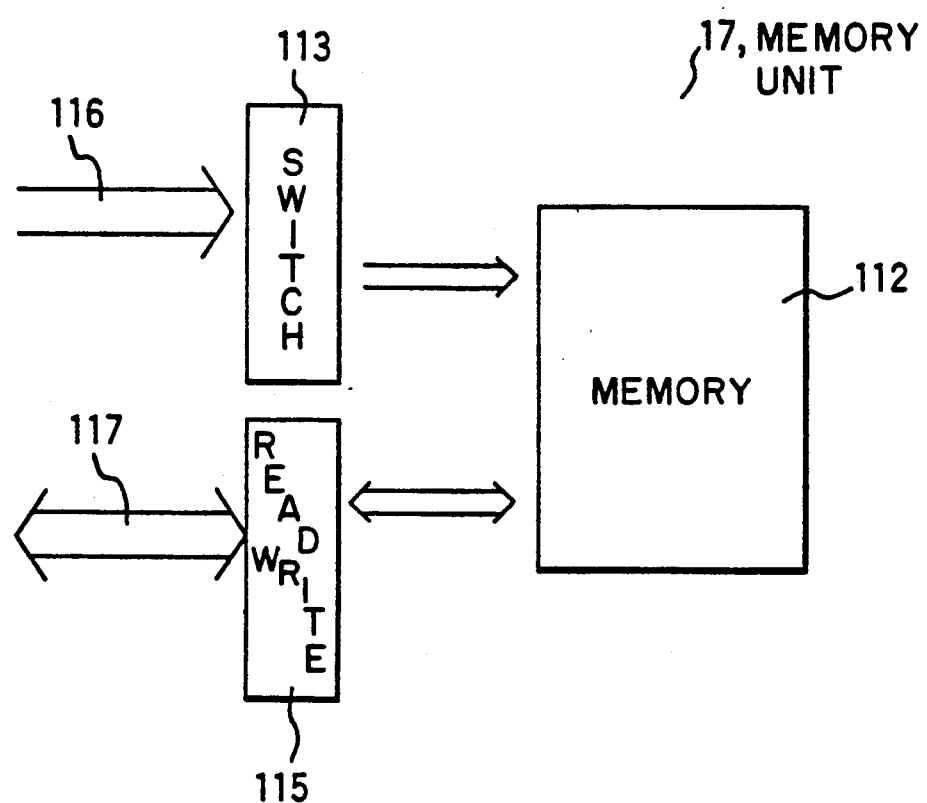
FIG. 28 is a block diagram showing the memory unit of this invention.

Referring to FIG. 28, reference numeral 17 represents a memory unit. This memory unit 17 is provided with a memory 112, a memory group switching unit 113, and a memory read/write unit 115. Reference numeral 116 represents an address bus, and reference numeral 117 represents a data bus.

Figure 29:
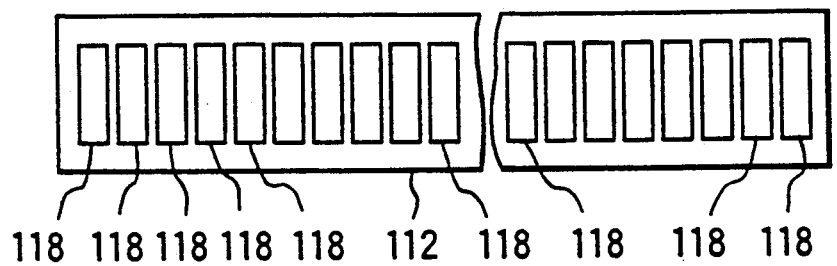
FIG. 29 shows an example of the structure of a memory of the memory unit shown in FIG. 28.

As shown in FIG. 29, the memory 112 is constructed of n (n=32) memory sub-groups 118 each having a capacity of 8 bits×1M words capable of reading/writing k (k=8) bits in parallel. The memory 112 therefore has a capacity of 32M bytes. Each memory sub-group is constructed of eight memory chips each having a capacity of 1 bit×1M words.

Figure 31:
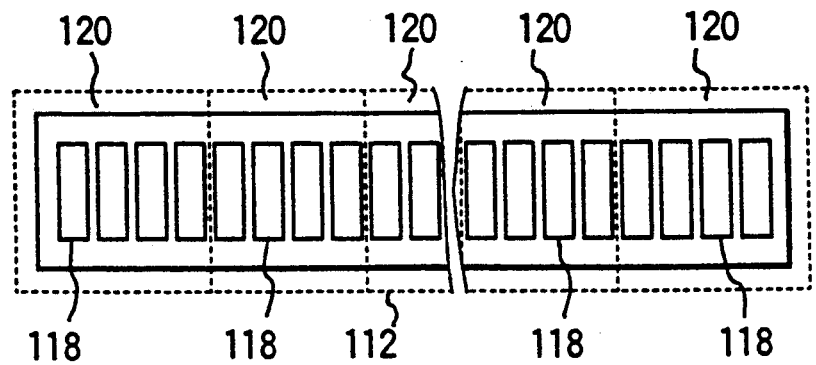
FIG. 31 is a plane view explaining an example of arrangement of memory groups of the memory.
Figure 32:
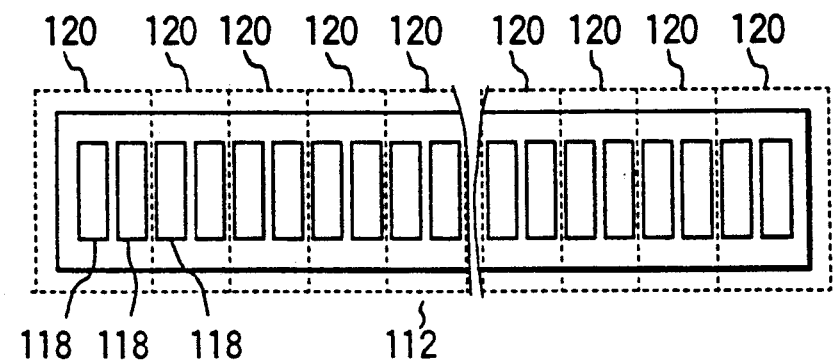
FIG. 32 is a plane view explaining another example of arrangement of memory groups of the memory.
Figure 33:
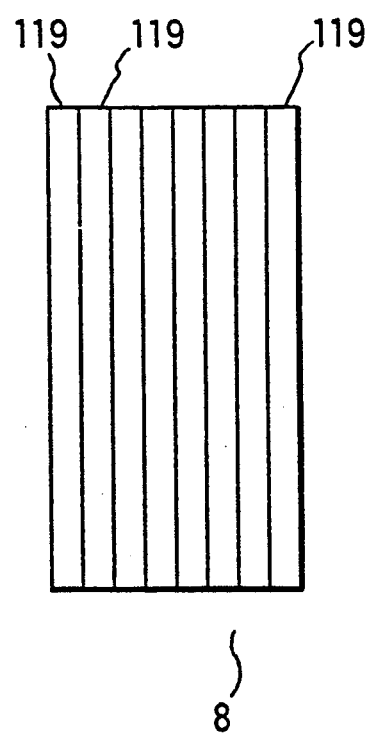
FIG. 33 is a plane view explaining an example of arrangement of the memory sub-group.

The memory group switching unit 113 selects one of n/s memory groups 120 constituting the n (n=32) memory sub-groups 118 of the memory 112, where s is determined in accordance with the number (8×s) of bits to be processed at a time (see to FIGS. 31 and 32).

Figure 30:
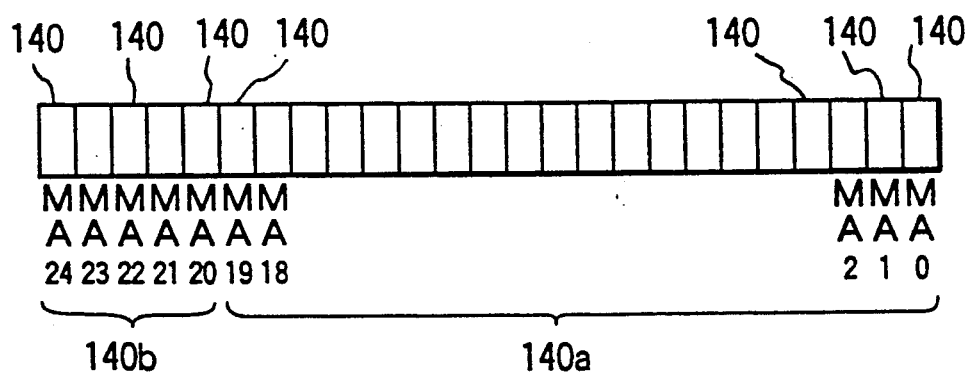
FIG. 30 shows address signal lines of the memory of the memory unit shown in FIG. 28.

As shown in FIG. 30, the memory 112 is provided with 25 bit address signal lines 140 (MA0 to MA24). The lines MA0 to MA19 are used as word number designating lines 140a for disignating one of the word numbers including 1M words of each memory sub-group 118. The remaining 5 bit lines M20 to M24 are used as memory group number designating lines 140b for designating the memory group number of the memory group to be read/written. All the 5 bits lines are not necessarily used as will be described below.

Specifically, if the number of bits to be processed at a time is 8×s=32, then s=4 and the number of memory groups 120 is n/s=8. In order for the memory group switching unit 113 to select one of eight memory groups sequentially disposed each constructed of contiguous four memory sub-groups, only three memory group number designating lines are required. In this case, therefore, only MA20 to MA22 lines are used, and the remaining MA23 and MA24 are not used.

If the number of bits to be processed at a time is 8×s=16, then s=2 and the number of memory groups is 16. In this case, therefore, four lines MA20 to MA23 are used. In another case where the number of bits is 8×s=8, s=1 and the number of groups is 32. Therefore, all five lines MA20 to MA24 are used. As above, the lines MA20 to MA24 to be used are determined in accordance with the value s.

The number s of memory sub-groups constituting one memory group 120 is variably set by CPU or the like.

The memory read/write unit 115 can read/write, sequentially in the order of address, the memory portion of 8×s bits (k×s bits) designated by the memory group number and the word number within the memory group concerned. More in particular, the memory read/write unit 115 reads/writes the memory 112, in parallel via the address signal lines 140, in units of 8×s bits at the s memory sub-groups of the memory group designated by the memory group number which is determined from the value s, and at the word number designated by MA0 to MA19. If k×s bits are smaller than the data bus size such as 32 bits of an external processor, the remaining bits are read/written as invalid bits. In this manner, any unit number of data per one pixel corresponding to a bus size can be read/written by changing the number of memory sub-groups 118 constituting the memory group. Accordingly, a data of one pixel unit can be read at a fixed time without increasing the data processing time and without wastefully using the memory.

Figure 34:
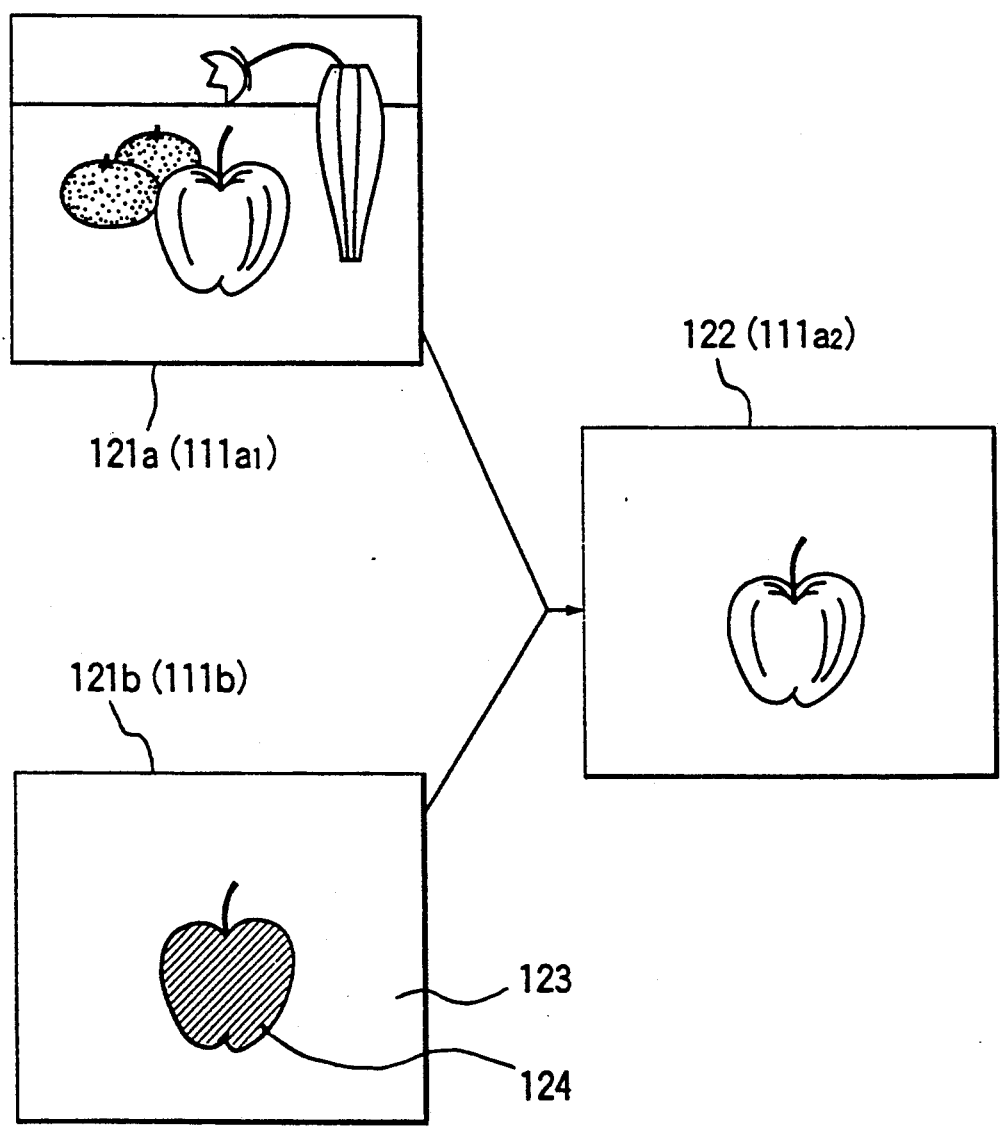
FIG. 34 illustrates a crop-masking method using the data width variable memory unit of this invention.

FIG. 34 illustrates a method of crop-masking an image by using three memory units of this invention, and more particularly a method of obtaining a full color image 122 by combining a full color image 121a and a masking image 121b.

First, the full color image 121a is stored in a memory unit 111a₁, and the masking image 121b is stored in a memory unit 111b.

The masking image 121b is constructed of pixels each having one bit binary data which takes a binary value A or B depending upon whether the pixel is within a crop-masked area 124 colored with one of two designated colors or within a non-crop-masked area 123 colored with the other designated color.

The full color image 121a has four colors Y, M, C and K each havig a data width of 8 bis, totaling 32 bits.

Data for one pixel is read from the memory unit, 111a₁ and from the memory unit 111b, during each cycle time. If the data from the memory unit 111b is A (i.e., the pixel is within the crop-masked area 124), the data from the memory unit 11a₁ is written in a memory unit 11a₂ for storing the full color image 122 at the corresponding address. If the data from the memory unit 111b is B (i.e., the pixel is within the non-crop-masked area 123), instead of the data from the memory unit 111a₁, the data 0s for all 32 bits is written in the memory unit 111a₂ at the corresponding address.

As appreciated from the foregoing description, according to the present invention, even if the data width of a pixel data or the like to be processed is not equal to the bus size, any unit number of data per one pixel corresponding to a bus size can be read/written by changing the number of memory sub-groups constituting the memory group. Accordingly, it is possible to obtain a memory unit by which a data of one pixel unit can be read at a fixed time with simplified data processing and without wastefully using the memory.

What is claimed is:

1. An image processing apparatus comprising:
    a memory unit for storing pixels of an image by a two-dimensional array of pixel addresses;
    an address supplier for generating two-dimensional addresses of pixels in the memory unit;
    a two- to one-dimensional address coordinate transformation unit for transformation between a set of one-dimensional address coordinate values of an image and a set of two-dimensional address coordinate of the image values, said two- to one-dimensional address coordinate transformation unit comprising offset address reading means responsive to addresses of said address supplier for tabulating addresses as a sequence of addresses;
    a two-dimensional coordinate transformation unit, operative with pixels of the image, for transforming coordinate values (x, y) of the image within a predetermined area on an x-y coordinate system into coordinate values (X, Y) within a predetermined area on an X-Y coordinate system;
    an inter-pixel data calculation unit, operative with pixel data of the image and with pixel data of a further image, for calculating pixel data of a composite image from pixels of said first-mentioned image and said further image; and
    wherein said memory unit stores each image.

2. A coordinate transformation method comprising steps of
    providing in a memory means an array of image pixels each with a two-dimensional address;
    generating by means of an address-supplier a sequence of two-dimensional addresses for reading out data of the pixels;
    reading data of the pixels via offset address to obtain a one-dimensional sequence of data points;
    wherein a sum $l = f(x) + g(y)$ image-pixel address functions $f(x)$ and $g(y)$ of two location-coordinate elements (x, y) is used as an address coordinate value on a one-dimensional coordinate system, said two elements being the two-dimensional coordinate values determining an address of a two-dimensional coordinate system.

3. An image coordinate transformation method comprising the steps of:
    storing image data in a memory wherein data points are arranged in a one-dimensional array, said storing including a step of locating each data point in said memory by an image address element;
    with respect to the array of data points, setting a value of an image address element $f(x)$ of a one-dimensional array to an image address element XT of a two-dimensional array as an element XTx;
    setting a value of an image address element $g(y)$ of a one-dimensional array to an image address element YT of a two-dimensional array as an element YTy;
    deriving XTx and YTy respectively corresponding to coordinate values x and y of a one-dimensional array of stored data points;
    adding XTx and YTy to output $l = f(x) + g(y)$ to thereby determine a correspondence between $a_{x,y}$ and $b_l$, wherein $a_{x,y}$ is a data of a coordinate value (x, y) on a two-dimensional coordinate system, $b_l$ is a data of a coordinate value l on a one-dimensional coordinate system for a one-dimensional medium, $f(x)$ is a function of x, XT is stored as an element of an x-direction address offset table for storing the value of $f(x)$, $g(y)$ is a function of y, and YT is stored as an element of a y-direction address offset table for storing the value of g(y).

4. An image coordinate transformation method according to claim 3, wherein
said functions f(x) and g(y) are determined in accordance with a positional correspondence between a data string on a two-dimensional coordinate system and a data string on a one-dimensional coordinate system of the recording medium.

5. An image coordinate transformation apparatus comprising:
a two-dimensional address supplier for supplying a two-dimensional address x, y of each pixel of an image;
an x-direction address offset table XT for storing offset address XTx for each value x wherein an offset address is a two-dimensional address reformulated for a one dimensional memory;
a y-direction address offset table YT for storing offset address YTx for each value y wherein an offset address is a two-dimensional address reformulated for a one dimensional memory;
an x-direction address offset reader XTR for reading Xtx for a give x value;
a y-direction address offset reader YTR for reading a given y value;
an adder for adding together XTx and YTy supplied from XTR and YTR; and
a calculation unit for setting the values of two-dimensional address functions f(x) and g(y) for values x and y in said x- and y-direction address offset tables.

6. A one-dimensional frame buffer for an image display device, comprising:
a two-dimensional address supplier for supplying a two-dimensional address x, y, of pixels of the image wherein the actual data of an element $a_{x,\ y}$ of a two-dimensional data matrix a (X, Y) of an image is stored in a one-dimensional data matrix b, said two matrices being related to each other by $b_\alpha + (y-1)X + (x-1) = a_{x,y}$ where $\alpha$ is an optional constant;
an x-direction address table XT for storing offset address XTx for each value x;
a y-direction address offset table YT for previously storing offset address YTx for each value y;
an x-direction address offset reader XTR for reading XTx for a given x value;
a y-direction address offset reader YTR for reading YTy for a given y value;
an adder for adding together XTx and YTy supplied from XTR and YTR; and
a calculation unit for setting the values of $f(x) = x - 1$ and $g(y) = (y-1)X + \alpha$ for values x and y in said x- and y-direction address offset tables.

7. A two-dimensional coordinate transformation method of performing coordinate transformation of an image using transformation equations $X = f(x) + g(y)$ and $Y = h(x) + k(y)$ for the transformation of coordinate values (x, y) on an x-y coordinate system within a predetermined area into coordinate values (X, Y) on an X-Y coordinate system within a predetermined area, where f(x) and h(x) are a function of x and g(y) and k(y) are a function of y, wherein there are provided an X-x correspondence value table Xx for storing values of f(x) for each value x, and X-y correspondence table Xy for storing values of g(y) for each value y, a Y-x correspondence value table Yx for storing values of h(x) for each value, and a Y-y correspondence value table Yy for storing values of k(y) for each value y, said method comprising the steps of:
storing the value of f(x) and h(x) in a first memory for each value x in cells $Xx_x$ and $Yx_x$ of Xx and Yx;
storing the value of g(x) and k(x) in a second memory for each value y in cells $Xy_y$ and $Yy_y$ of Xy and Yy;
reading the values of f(x) and h(x) or each value x from $Xx_x$ and $Yx_x$ from said first memory;
reading the values of g(y) and k(y) or each value y from $Xy_y$ and $Yy_y$ from said second memory;
outputting, by means of a summing circuit, a sum of the read values of f(x) and g(y) as a value X, and
outputting, by means of a summing circuit, a sum of the read values of h(x) and k(y) as a value Y.

8. A two-dimensional coordinate transformation apparatus for performing coordinate transformation using transformation equations $X = f(x) + g(y)$ and $Y = h(x) + k(y)$ for the transformation of coordinate values (x, y) of pixels of an image on an x-y coordinate system within a predetermined area into coordinate values (X, Y) on an X-Y coordinate system within a predetermined area, where f(x) and h(x) are a function of x and g(y) and k(y) are a function of y, said apparatus comprising:
a two-dimensional coordinate value supplier for supplying said coordinate value (x, y);
an X-x correspondence value table Xx for storing the value of f(x) for each value x;
an X-y correspondence table Xy for storing the value of g(y) for each value y;
a Y-x correspondence value table Yx for storing the value of h(x) for each value x;
a Y-y correspondence value table Yy for storing the value of k(y) for each value y;
an X-x correspondence value reader for reading the value of a cell $Xx_x$ of the X-x correspondence value table for a given value x;
a Y-x correspondence value reader for reading the value of a cell $Yx_x$ of the Y-x correspondence value table for a given value x;
an X-y correspondence value reader for reading the value of a cell $Xy_y$ of the X-y correspondence value table for a given y;
a Y-y correspondence value reader for reading the value of a cell $Xx_y$ of the Y-y correspondence value table for a given y;
an X coordinate value calculator for outputting a sum of the read-out values of cells $Xx_x$ and $Xy_x$ as a value X; and
a Y coordinate value calculator for outputting a sum of the read-out values of cells $Yx_x$ and $Yy_y$ as a value Y.

9. A coordinate method transformation method for the coordinate transformation of coordinate values (x,y) of pixels of an image on an x-y coordinate system into coordinate values (X, Y) on an X-Y coordinate system, comprising the steps of:
addressing a memory unit with an address from an address supplier preparatory to storing data in the memory unit;
storing the data of a function $f_{x,y}(X,Y)$ in the memory unit at the address represented by the coordinate values (x,Y) said function being selected such that the values X and Y can be separately derived for given x and y; and
separately deriving, by means of a computational device, the valus X and Y from the data of the function $f_{x,y}(x,y)$ for the give address (x,y), and outputting the valus X and Y as coordinate values (X,Y) of image pixels.

10. A coordinate transformation method according to claim 9, wherein
the data of the function $f_{x,y}(X,Y)$ is represented as $f_{x,y}(X,Y)=X*2^\alpha+Y$, wherein X and Y are image pixel address of the XY coordinate system and are represented by a binary notion and $\alpha$ is an integer larger than the number of digits of Y.

11. A coordinate transformation method according to claim 9, further comprising a step of calculating the data of the function $f_{x,y}(X,Y)$ by a calculator in accordance with a transformation equation of correspondence between the coordinate systems.

12. A coordinate transformation method according to claim 9, further comprising steps of inputting image data from a color scanner, wherein the coordinate value (x,y) are the coordinate values of a pixel inputted from the color scanner, and data stored at address of X and Y represents the tonal value for each color of an inputted pixel.

13. A coordinate transformation apparatus comprising:
a memory unit for storing the data of a function $f_{x,y}(X,Y)$ said memory unit outputting coordinate address values X and Y in response to a coordinate value address (x,y) supplied to the memory;
a processor for obtaining the data of the function $f_{x,y}(X,Y)$ for all x and y addresses of an image area, the data being transferred from the processor to the memory unit;
a reader for reading the data of the function $f_{x,y}(X,Y)$ from the memory unit for a given coordinate address (x,y); and
an XY coordinate value pickup unit for separately picking up and outputting data stored at the address values X and Y from the read data of the function $f_{x,y}(X,Y)$.

14. An image conversion method comprising the steps of:
storing the data of a function $f_{x,y}(X,Y)$ in a memory unit at a coordinate value address (x,y) for each pixel, said function being selected such that the address values X and Y of each pixel for a separate coordinate system can be separately derived for given x and y;
transforming in a calculator the coordinate valus (x,y) into coordinate values (X,Y) in accordance with a coordinate transformation method by which the values of pixel addresses X and Y are separately derived from the data of the function $f_{x,y}(X,Y)$ for a given pixel address (x,y) and the values X and Y are outputted as the coordinate values (X, Y); and
reading data from an image memory storing an original image at the address (x,y) and writing the read data in a converted image writing memory at the address (X,Y) or reading the data from the image memory at the address (X,Y) and writing the read data in a converted image writing memory at the address (x,y).

* * * * *